United States Patent
Ragland et al.

(10) Patent No.: US 12,316,527 B2
(45) Date of Patent: May 27, 2025

(54) NETWORK SYSTEM FOR ENHANCED COMMUNICATION USING MULTIPLE PATHS

(71) Applicant: Hughes Network Systems, LLC, Germantown, MD (US)

(72) Inventors: Roderick J. Ragland, Rockville, MD (US); John Dennis Kenyon, Silver Spring, MD (US); Douglas M. Dillon, Rockville, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 0 days.

(21) Appl. No.: 18/501,796

(22) Filed: Nov. 3, 2023

(65) Prior Publication Data
US 2025/0150382 A1     May 8, 2025

(51) Int. Cl.
*H04L 45/12*     (2022.01)
*H04L 43/0894*   (2022.01)
*H04L 45/24*     (2022.01)

(52) U.S. Cl.
CPC ........ *H04L 45/123* (2013.01); *H04L 43/0894* (2013.01); *H04L 45/24* (2013.01)

(58) Field of Classification Search
CPC .... H04L 45/123; H04L 43/0894; H04L 45/24
See application file for complete search history.

(56) References Cited

U.S. PATENT DOCUMENTS

| | | | |
|---|---|---|---|
| 7,395,348 B1 * | 7/2008 | Cieslak | H04L 67/568 709/238 |
| 2006/0050736 A1 * | 3/2006 | Segel | H04B 7/18591 370/542 |
| 2016/0323186 A1 * | 11/2016 | Dillon | H04L 61/4511 |

(Continued)

FOREIGN PATENT DOCUMENTS

| | | | | |
|---|---|---|---|---|
| WO | WO-9944335 A2 * | 9/1999 | | H04L 12/00 |
| WO | 2016049609 A1 | 3/2016 | | |

OTHER PUBLICATIONS

European Patent Office, "International Search Report and Written Opinion for Application No. PCT/US2024/054145", mailed Jan. 28, 2025, 24 pages.

*Primary Examiner* — Andrew C Georgandellis
(74) *Attorney, Agent, or Firm* — Mannava & Kang, P.C.

(57) ABSTRACT

A system and method for managing network communication in an asymmetric network environment. The system includes a gateway. The gateway receives a plurality of packets for transmission over first communication network. The plurality of packets are received via primary network path. The gateway dynamically evaluates the plurality of packets. The gateway classifies the plurality of packets into a latency sensitive packet and a latency agnostic packet. The gateway determines network capacity of the primary network path and a secondary network path. The gateway splits the latency sensitive packet and the latency agnostic packet between the primary network path and the secondary network path. The gateway selects the primary network path for (Continued)

transmitting the latency sensitive packet. The gateway selects the secondary network path for transmitting the latency agnostic packet over downstream transmission. Furthermore, the gateway transmits the latency sensitive packet and the latency agnostic packet to a client device.

18 Claims, 9 Drawing Sheets

(56) References Cited

U.S. PATENT DOCUMENTS

| | | | |
|---|---|---|---|
| 2019/0158371 A1* | 5/2019 | Dillon | H04L 47/196 |
| 2020/0396150 A1* | 12/2020 | Dillon | H04L 12/2867 |
| 2022/0417151 A1 | 12/2022 | Sze et al. | |

* cited by examiner

NETWORK SYSTEM FOR ENHANCED COMMUNICATION USING MULTIPLE PATHS

TECHNICAL FIELD

This patent application is directed to communication systems and, more specifically, to systems and methods for enhancing communication in an asymmetric network environment using multiple paths.

BACKGROUND

With the advent of technologies providing high speed internet connectivity and enhanced network communication, there has been a continuous requirement to improve user experiences, increase data transfer rates, and provide efficient network utilization. Some of the existing solutions use dial-up connections as primary means of access to internet connectivity. Further, solutions that use a digital satellite receiver for a satellite television application as a primary means of access was developed. The utilization of digital satellite receiver for the satellite television led to a realization that a satellite communication fundamentally involves transmitting data packets through airwaves. This solution later evolved into a two-way satellite service. Despite the advancements, the latency introduced by satellite communication remained a challenge, particularly for activities that are sensitive to latency.

Some of the communication technologies such as terrestrial wireless networks and satellite networks play pivotal roles in providing internet connectivity to users. However, various challenges persist in both the terrestrial wireless networks and the satellite networks. Although the terrestrial wireless networks are widely accessible, they suffer from limitations in coverage, signal strength, and performance, especially over long distances or in adverse weather or indoor structure conditions. For example, the networks of ground-based wireless systems, such as cellular telephony services, air-to-ground networks, and the like, may provide a connectivity with a low latency, and/or other types of degraded network performance. Specifically, the wireless cellular networks provide internet access with considerably low latency. Additionally, the wireless cellular networks provide satisfactory performance for applications sensitive to latency. However, the wireless cellular networks frequently exhibit lower bulk transfer throughput speed or higher congestion.

On the other hand, the satellite networks provide extensive coverage, which are limited by latency and capacity constraints, particularly in the upstream direction. Further, the geosynchronous satellite networks provide a high-speed service, where wired service (e.g., cable modem or fiber) may not be available. However, the geosynchronous satellite networks has a longer latency than terrestrial alternatives with a round-trip time of approximately 600 ms to 900 ms versus sub-100 ms terrestrial round-trip times. The performance of applications which are latency sensitive, such as some web browsing, a gaming, Virtual Private Networks (VPNs), and the like, may not include satisfactory responsiveness as compared to the terrestrial access networks. However, the satellite wireless networks may be preferable for carrying bulk transfers (e.g., streaming video), as it provides good performance for carrying bulk transfers. The satellite wireless networks may also be referred herein after as a high-throughput satellite (HTS). Additionally, some of the solutions provide systems for combining satellite and terrestrial services. However, such combined services focus on leveraging satellite for outbound data while utilizing terrestrial networks for return traffic. However, the terrestrial networks suffer from coverage drop-offs, especially as the distance from transmission towers increases.

Consequently, there may be a need for an improved system and method for enhancing communication in an asymmetric network environment using multiple paths. Further, there exists a need for an improved system and method for providing a high-speed broadband internet capability to underserved areas that include limited or no access to cable or fiber networks.

SUMMARY

This summary is provided to introduce a selection of concepts, in a simple manner, which is further described in the detailed description of the disclosure. This summary is neither intended to identify essential inventive concepts of the subject matter nor to determine the scope of the disclosure.

An aspect of the present disclosure provides a system for managing network communication in an asymmetric network environment. The system includes a gateway. The gateway receives a plurality of packets for transmission over a first communication network. The plurality of packets are received via a primary network path. The gateway further dynamically evaluates each of the received plurality of packets based on a plurality of parameters. Furthermore, the gateway classifies each of the plurality of packets into a latency sensitive packet and a latency agnostic packet based on the dynamic evaluation. Additionally, the gateway determines network capacity of the primary network path and a secondary network path to transmit the latency sensitive packet and the latency agnostic packet for a downstream transmission. Further, the gateway splits the latency sensitive packet and the latency agnostic packet between the primary network path and the secondary network path, based on the determined network capacity. For splitting the latency sensitive packet and the latency agnostic packet, the gateway selects the primary network path for transmitting the latency sensitive packet over the downstream transmission. The determined network capacity of the primary network path is greater than the threshold value. Also, the gateway selects the secondary network path for transmitting the latency agnostic packet over the downstream transmission. The determined network capacity of the secondary network path is greater than the threshold value. Furthermore, the gateway transmits the latency sensitive packet and the latency agnostic packet to a client device based on the selection.

Another aspect of the present disclosure provides a method for managing network communication in an asymmetric network environment. The method includes receiving a plurality of packets for transmission over a first communication network. The plurality of packets are received via a primary network path. The method further includes dynamically evaluating each of the received plurality of packets based on a plurality of parameters. Further, the method includes classifying each of the plurality of packets into a latency sensitive packet and a latency agnostic packet based on the dynamic evaluation. Furthermore, the method includes determining network capacity of the primary network path and a secondary network path to transmit the latency sensitive packet and the latency agnostic packet for a downstream transmission. Furthermore, the method includes splitting the latency sensitive packet and the latency agnostic packet between the primary network path and the secondary network path based on the determined network capacity. The latency sensitive packet and the latency agnostic packet are split by selecting the primary network path for transmitting the latency sensitive packet over the downstream transmission. The determined network capacity of the primary network path is greater than the threshold value. Furthermore, the method includes selecting the secondary network path for transmitting the latency agnostic packet over the downstream transmission. The determined network capacity of the secondary network path is greater than the threshold value. Additionally, the method includes transmitting the latency sensitive packet and the latency agnostic packet to a client device, based on the selection.

Yet another aspect of the present disclosure provides a non-transitory computer-readable medium comprising machine-readable instructions that are executable by a processor. The processor receives a plurality of packets for transmission over a first communication network. The plurality of packets are received via a primary network path. Further, the processor dynamically evaluates each of the received plurality of packets based on a plurality of parameters. Furthermore, the processor classifies each of the plurality of packets into a latency sensitive packet and a latency agnostic packet based on the dynamic evaluation. Additionally, the processor determines network capacity of the primary network path and a secondary network path to transmit the latency sensitive packet and the latency agnostic packet for a downstream transmission. Further, the processor splits the latency sensitive packet and the latency agnostic packet between the primary network path and the secondary network path based on the determined network capacity. The latency sensitive packet and the latency agnostic packet are split by selecting the primary network path for transmitting the latency sensitive packet over the downstream transmission. The determined network capacity of the primary network path is greater than the threshold value. Furthermore, the latency sensitive packet and the latency agnostic packet are split by selecting the secondary network path for transmitting the latency agnostic packet over the downstream transmission. The determined network capacity of the secondary network path is greater than the threshold value. Additionally, the processor transmits the latency sensitive packet and the latency agnostic packet to a client device, based on the selection.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

Features of the disclosed embodiments are illustrated by way of example and not limited in the following Figure(s), in which like numerals indicate like elements, in which.

Figure 1A:
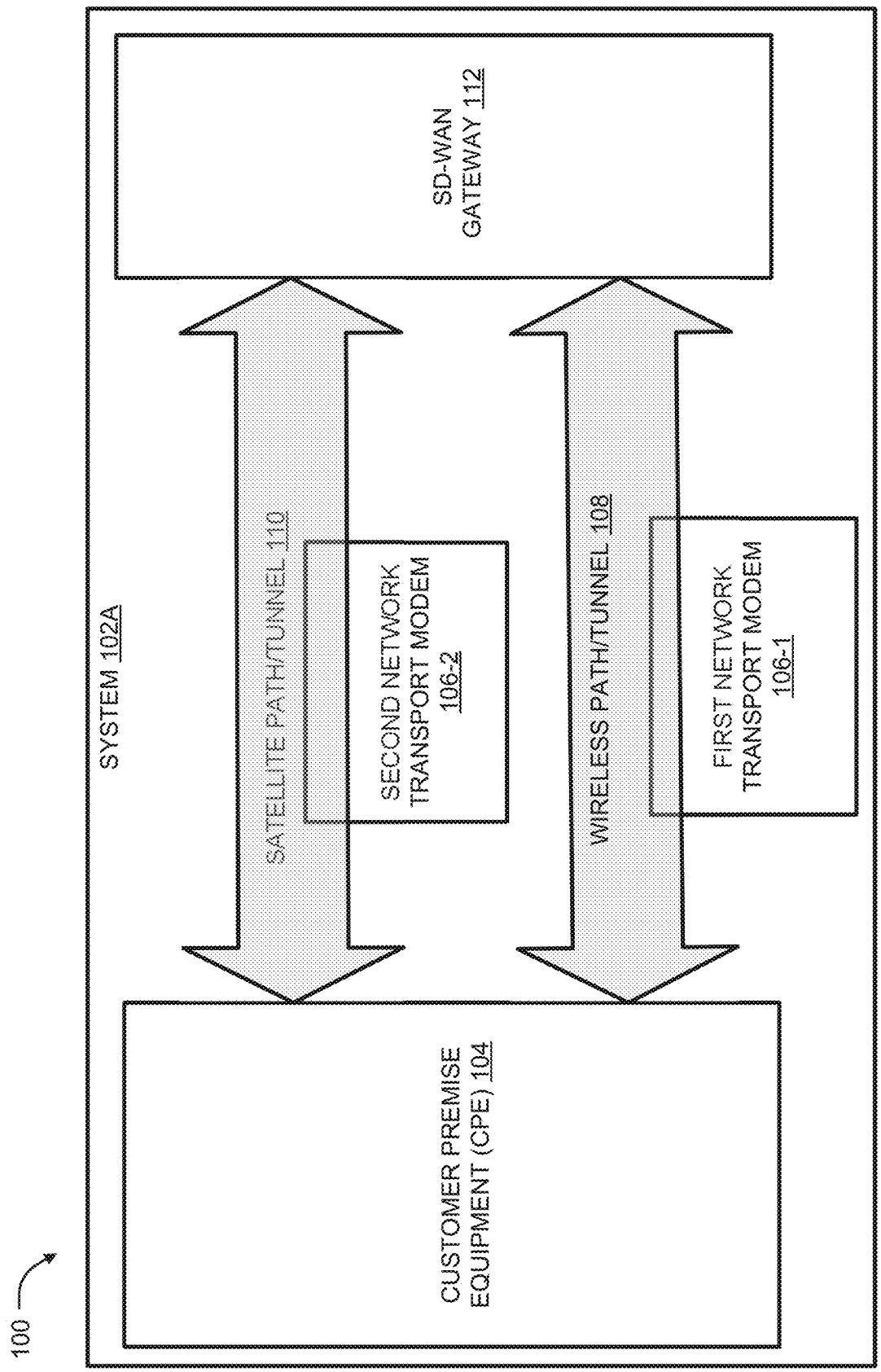
FIG. 1A illustrates an example block diagram representation of a network architecture implementing a system capable of managing network communication in an asymmetric network environment, according to an example.

Further, those skilled in the art will appreciate those elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being performed or considered.

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure. It will be understood by those skilled in the art that the foregoing general description and the following detailed description are exemplary and explanatory of the disclosure and are not intended to be restrictive thereof.

In the present document, the word "exemplary" is used herein to mean "serving as an example, instance, or illustration." Any embodiment or implementation of the present subject matter described herein as "exemplary" is not necessarily to be construed as preferred or advantageous over other embodiments. The terms "comprise," "comprising," or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules. Appearances of the phrase "in an embodiment," "in another embodiment," "in an exemplary embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting. A computer system (standalone, client, server, or computer-implemented system) configured by an application may constitute a "module" (or "subsystem") that is configured and operated to perform certain operations. In one embodiment, the "module" or "subsystem" may be implemented mechanically or electronically, so a module includes dedicated circuitry or logic that is permanently configured (within a special-purpose processor) to perform certain operations. In another embodiment, a "module" or a "subsystem" may also comprise programmable logic or circuitry (as encompassed within a general-purpose processor or other programmable processor) that is temporarily configured by software to perform certain operations. Accordingly, the term "module" or "subsystem" should be understood to encompass a tangible entity, be that an entity that is physically constructed permanently configured (hardwired), or temporarily configured (programmed) to operate in a certain manner and/or to perform certain operations described herein.

The disclosed technology falls generally within the field of networking technology and relates to an internet access. The geosynchronous satellites may provide ubiquitous connectivity but operate with an order of magnitude higher latency than terrestrial network connectivity and where TCP spoofing may be used to reduce the effect of latency on bulk transfer throughput, wireless cell phone-oriented networking, e.g., using technologies such as fourth generation (4G), long term evolution (LTE) and fifth generation (5G), sixth generation (6G), and/or other wireless technologies, to provide wireless connectivity to the internet; software-defined wide area networking (SD-WAN), e.g., where multiple (typically two) broadband transports are combined to provide better service and availability than what is provided by either transport individually.

The techniques described herein may be referred to as an agile-switching active-path (ASAP) feature that may be used in acceleration appliances and other WAN optimization technologies. As discussed below, the system may adaptively switch between using satellite-based network access technology and other network access technology (e.g., cellular network access, wired network access, etc.), or provide different types of traffic on the different access technologies, to achieve, for example, improved throughput, lower latency, and other benefits.

The multiple network transport modems may be available concurrently and the network device may concurrently use both transport modems. This may include splitting a single Internet Protocol (IP) flow across the multiple transport modems, which may often provide overall latency, throughput, and other performance results. Such network devices may establish a packet tunnel for each different network transport modem and tunneled packets may include resequencing information, such as an IP flow identifier and a sequence number indicating a position of the packet in the sequence. At the receiving side, the packets received through multiple tunnels may be "un-tunneled" and the various IP flows may be reconstructed based on re-sequencing of the information.

The selection of a network transport modem may be performed at a fine-grained level, e.g., for each packet or group of packets. The selection of a network transport modem for a given packet may also account for dynamically changing network conditions of the associated communication network. Rather than simply assuming that the baseline or ideal conditions prevail for the different network transport modems, the network device may use observed and actual network conditions for the network transport modems to estimate the latency that would be experienced at that instant time and for the specific packet being processed.

Examples of the present disclosure provides a system and method for managing network communication in an asymmetric network environment. The system includes a gateway. The gateway receives a plurality of packets for transmission over a first communication network. The plurality of packets are received via a primary network path. The gateway further dynamically evaluates each of the received plurality of packets based on a plurality of parameters. Furthermore, the gateway classifies each of the plurality of packets into a latency sensitive packet and a latency agnostic packet based on the dynamic evaluation. Additionally, the gateway determines network capacity of the primary network path and a secondary network path to transmit the latency sensitive packet and the latency agnostic packet for a downstream transmission. Further, the gateway splits the latency sensitive packet and the latency agnostic packet between the primary network path and the secondary network path, based on the determined network capacity. For splitting the latency sensitive packet and the latency agnostic packet, the gateway selects the primary network path for transmitting the latency sensitive packet over the downstream transmission. The determined network capacity of the primary network path is greater than the threshold value. Also, the gateway selects the secondary network path for transmitting the latency agnostic packet over the downstream transmission. The determined network capacity of the secondary network path is greater than the threshold value. Furthermore, the gateway transmits the latency sensitive packet and the latency agnostic packet to a client device based on the selection.

FIG. 1A illustrates an example block diagram representation of a network architecture 100 implementing a system 102A capable of managing network communication in an asymmetric network environment, according to an example. It should be appreciated that the system 102A depicted in FIG. 1A may be an example. Hence, the system 102A may or may not include additional features and some of the features described herein may be removed and/or modified without departing from the scopes of the system 102A outlined herein. In some examples, the network architecture 100 may depict a satellite communication system capable of providing at least voice and/or data services. In some examples, the satellite communication may be a high throughput satellite (HTS) system, and/or other satellite types. In one example, the system 102A includes a customer premise equipment 104 and a SD-WAN gateway 112. The customer premise equipment 104 may use a different tunnel for each network transport modem available. At least one packet is tunneled between the customer premise equipment 104 and the SD-WAN gateway 112. The customer premise equipment 104 may be connected to the SD-WAN gateway 112 via a first network transport modem 106-1 and a second network transport modem 106-2. In an example, the term customer premise equipment 104 may also be referred herein as network apparatus.

For example, a primary network path, a wireless path/tunnel 108 (hereinafter interchangeably referred to as the wireless path/tunnel 108) may be established for packets exchanged over the first network transport modem 106-1. A secondary network path, (hereinafter interchangeably referred to as the satellite path 110 or the satellite tunnel 110), may be established for packets exchanged over the second network transport modem 106-2. The primary network path 108, and the secondary network path 110 may represent the ability of the customer premise equipment 104, to forward packets to the first network transport modem 106-1 and/or the second network transport modem 106-2.

In an example, the first network transport modem 106-1 may correspond to a mobile wireless modem/terminal, and the second network transport modem 106-2 may correspond to a mobile high-throughput satellite (HTS) modem/terminal. In an example, the second network transport modem 106-2 may include a directional antenna (not shown in FIG. 1), a single directional antenna (not shown in FIG. 1), and/or a single receiver (not shown in FIG. 1). Although, the first network transport modem 106-1 and the second network transport modem 106-2 may typically remain in the same location once mounted, the transport modems may be removed from their mounts, relocated to another location, and/or may be configured to be mobile terminals. For example, the transport modems may be mounted on mobile platforms that facilitate transportation thereof from one location to another. Such mobile platforms may include, for example, any number of mobile vehicles, such as airplanes, cars, buses, boats, trucks, troop-carriers, or other vehicles, and/or other types of vehicles/transporting means. It should be appreciated that such transport modems may generally be operational when still and not while being transported. That said, there may be scenarios where the transport modems may be transportable (mobile) terminals that remain operational during transit.

In an example, the system 102A may be implemented as a standalone device such as a networking apparatus or device. In an example, each of the customer premise equipment 104, and the SD-WAN gateway 112 may be implemented as a standalone device. In another example, the customer premise equipment 104, and the SD-WAN gateway 112 may be implemented and integrated into an existing network device/network apparatus.

The network architecture 100 may include other system elements or components and is not limited to the components shown in FIG. 1. For example, the system 102A may include a second network transport modem with a directional antenna as shown in FIG. 1C, a second network transport modem with a single antenna and a single receiver as shown in FIG. 1D, a processor, and a memory comprising modules as shown in FIG. 1E, and a server and a client device as shown in FIG. 1F. The disclosed technology may be implemented in different ways as shown in FIGS. 1A to 1F (system 102A, system 102B, system 102C, system 102D, system 102E, and system 102F).

It should be appreciated that the network architecture 100 and the system(s) are depicted in FIGS. 1A-1F may be a few example implementations. Hence, the network architecture 100 may or may not include additional features and some of the features described herein may be removed and/or modified without departing from the scope of the network architecture 100 outlined herein.

In some examples, the network architecture 100 may also include a private network and/or public network (not shown in FIGS. 1A-1F). The private network and/or public network may include any variations of networks. For example, the private network may be a local area network (LAN), and the public network may be a wide area network (WAN). Also, the private network and/or public network may each be a local area network (LAN), wide area network (WAN), the Internet, a cellular network, a cable network, a satellite network, or other network that facilitates communication between the components of network architecture 100 as well as any external element or system connected to the private network and/or public network. The private network and/or public network may further include one, or any number, of the exemplary types of networks mentioned above operating as a stand-alone network or in cooperation with each other. For example, the private network and/or public network may utilize one or more protocols of one or more clients or servers to which they are communicatively coupled. The private network and/or public network may facilitate the transmission of data according to a transmission protocol of any of the devices and/or systems in the private network and/or public network. Although each of the private network and/or public network may be a single network, it should be appreciated that in some examples, each of the private network and/or public network may include a plurality of interconnected networks as well.

Further, the network architecture 100 may include terminals (not shown in FIGS. 1A-1F) which may be used by, but is not limited to, a user, a customer, an administrator, a network operator, a flight/ship operator, a driver, and/or type of users. Depending on the application, the terminals may include or incorporate any number of antenna dishes, which may be provided in various sizes, depths, or dimensions (e.g., small, medium, or large). Although the terminals may typically remain in the same location once mounted, the terminals may be removed from their mounts, relocated to another location, and/or may be configured to be mobile terminals. For example, the terminals may be mounted on mobile platforms that facilitate transportation thereof from one location to another. Such mobile platforms may include, for example, any number of mobile vehicles, such as airplanes, cars, buses, boats, trucks, troop-carriers, or other vehicles, and/or other type of vehicles/commuting means. It should be appreciated that such terminals may generally be operational when still and not while being transported. That said, there may be scenarios where the terminals may be transportable (mobile) terminals that remain operational during transit. As used herein, the terms "terminal," "customer terminal," "satellite terminal," and/or "very small aperture terminal (VSAT)" may be used interchangeably to refer to these terminal types.

It should be appreciated that any number of customer-premise equipment (CPE) 104 may be communicatively coupled to the terminals. In some examples, the customer premise equipment (CPE) 104 may include any number of computing or mobile devices. For example, such a computing or mobile device may include, but is not limited to, a laptop, a tablet, a mobile phone, an appliance, a camera, a sensor, a thermostat, a vehicle, a display, and/or other interfaces. In general, the customer premise equipment (CPE) 104 may include, without limitation, any number of network-enabled computing devices, elements, or systems. It should be appreciated that a network of such devices may be commonly referred to as "Internet of Things" (IoT). The CPE 104 may be provided as a standalone, transport integrated, hybrid integrated, or fully integrated single device solution. In the standalone configuration, all WAN modems and accelerators are provided as standalone devices.

In another example, a point of presence (POP) or a network operation center (NOC) may be included in the network architecture 100. For example, the POP may be instantiated for load balancing and scaling to load. The location of the POP may be strategic to optimize transport modem characteristics such as latency, jitter, throughput, and/or network issues. The POP may include VPN firewalls to block unwanted intrusion or malicious software/connections. The PoP may serve as an endpoint to additional VPN tunnels. Multiple VPN firewalls may be desired for scalability and load balancing. The POP may include one or more enterprise routers to route traffic between the accelerator gateway and the public internet. Routers may route traffic to private networks. Multiple routers may exist for scaling and load balancing. For example, the POP may be implemented in the SD-WAN gateway 112.

Further, the network architecture 100 may include a satellite (not shown in FIGS. 1A-1F) which may be an object intentionally placed into orbit. In some examples, the satellite may be an artificial satellite that may be configured to transmit and receive data signals. For example, the satellite may form one or more beams (e.g., spot beams) and provide connectivity between at least the terminals and the SD-WAN gateway 112. More specifically, the satellite may communicate data signals using these beams with the terminals via a terminal return channel and a terminal forward channel, and with the SD-WAN gateway 112 via a gateway return channel and a gateway forward channel (not shown). It should be appreciated that the satellite may from any number of beams to communicate data signals with any number of components, even beyond the terminals or the SD-WAN gateway 112.

In some examples, the satellite may be a communication satellite, such as a high-throughput satellite, which may include any satellite that may be capable of providing at least twice (e.g., 20+ times, 100+ times, etc.) the total amount of throughput as a classic fixed-satellite service (FSS) satellite. In some examples, the satellite may include, but is not limited to, a transponder satellite, a regenerative satellite, and/or other similar satellite that may generate one or more spot beams. Furthermore, in some examples, the satellite may operate in geosynchronous, mid-earth, low-earth, elliptical, or some other orbital configuration. For example, a geostationary earth orbit (GEO) spot beam, a low-earth orbit (LEO) satellite, a medium earth orbit spot beam, and/or other type of spot beam.

While the processors, components, elements, systems, subsystems, and/or other computing devices may be shown as single components or elements, one of ordinary skill in the art would recognize that these single components or elements may represent multiple components or elements and that these components or elements may be connected via one or more networks. Also, middleware (not shown) may be included with any of the elements or components described herein. The middleware may include software hosted by one or more servers. Furthermore, it should be appreciated that some of the middleware or servers may or may not be needed to achieve functionality. Other types of servers, middleware, systems, platforms, and applications not shown may also be provided at the front-end or back-end to facilitate the features and functionalities of the network architecture 100, and components, as shown in FIGS. 1A-1F.

The examples of the systems and methods herein may be used in mobile internet access, including with applications to a virtual private network (VPN) provided private networking. Further, systems and methods herein may enable WAN optimization, in which existing Internet and VPN networking may be optimized or improved to provide for a Quality-Of-Service (QOS) overlay which supports multiple classes of services across a broadband connection, which does not support QoS itself. Furthermore, systems and methods herein may be used in mobile satellite communications. For example, where geosynchronous satellites may provide ubiquitous connectivity, however, operate with an order of magnitude higher latency than terrestrial network connectivity and where TCP PEP'ed may be used to reduce the effect of latency on bulk transfer throughput. Additionally, systems and methods herein may be used in wireless cell phone-oriented networking, using technologies such as 4G, LTE, 5G, and 6G to provide wireless connectivity to the Internet. Further, the systems and methods herein may be used in the SD-WAN, where multiple (typically two) broadband transport modems are combined to provide better service and availability than what is provided by either transport individually.

In an example, the system 102A may configure the SD-WAN gateway 112 to receive a plurality of packets for transmission over a first communication network. The plurality of packets are received via a primary network path. In an example, the primary network path may be the wireless path/tunnel 108.

In an example, the system 102A may configure the SD-WAN gateway 112 to dynamically evaluate each of the received plurality of packets, based on a plurality of parameters. The plurality of parameters may include, but not limited to, port addresses, historical characteristics of a session, packet size, network capacity, packet error rate, packet metadata and the like. The evaluation of each of the received plurality of packets may be performed using for example, but not limited to, deep packet inspection techniques such as a Sand vine, and the like.

In an example, to dynamically evaluate each of the received plurality of packets, based on a plurality of parameters, the system 102A may configure the SD-WAN gateway 112 to map the plurality of parameters with a corresponding parameters stored in a network table. The network table indicates a latency type to be associated with the received packet, the latency type indicated in the table is determined based on measures of expected latency of the plurality of network transports. Further, the system 102A may configure the SD-WAN gateway 112 to dynamically evaluate each of the received plurality of packets based on the results of mapping.

In an example, the system 102A may configure the SD-WAN gateway 112 to receive network status information, the plurality of parameters, latency parameters, network congestion information, forward network queue and a backend network queue based on load over ongoing communication sessions from at least one of the first network transport modem and the second network transport modem. Further, the system 102A may configure the SD-WAN gateway 112 to estimate an available network capacity for the downstream transmission of at least one packet based on the received network status information, the plurality of parameters, latency parameters, network congestion information, the forward network queue and the backend network queue based on the load over the ongoing sessions. In an example, the available network capacity for the downstream transmission of the at least one packet varies responsive to a change in a spot beam ID or a wireless cell ID.

Additionally, the system 102A may configure the SD-WAN gateway 112 to prioritize, the latency sensitive packet and the latency agnostic packet between the primary network path and the secondary network path based on the estimated available capacity for the downstream transmission of the at least one packet, wherein the latency sensitive packet and the latency agnostic packet is prioritized using a rate-limited priority queue. Furthermore, the system 102A may configure the SD-WAN gateway 112 to adjust, the rate limited priority queue for a continuity of the ongoing communication sessions corresponding to the downstream transmission of the at least one packet, responsive to a change in network conditions of the communication network during the downstream transmission.

In another example, the system 102A may configure the SD-WAN gateway 112 to predict network traffic at the ongoing session based on one or more user activities performing at the ongoing session; and pre-allot the network capacity associated with the corresponding network path for transmission of the packet based on the predicted network traffic. The one or more user activities may include, but not limited to, utilizing multiple internet sessions on multiple web applications at a same time, performing video sessions, audio sessions and the like.

In an example, the system 102A may configure the SD-WAN gateway 112 to classify each of the plurality of packets into a latency sensitive packet and a latency agnostic packet based on the dynamic evaluation. In an example, the system 102A may configure the SD-WAN gateway 112 to examine the packet and assign the packet a class-of-service based on the content of the packet. Further, the SD-WAN gateway 112 tags the packet with an amount of prioritization information such that when the packet reaches a priority queue with respect to rate limiter, such queue may prioritize the schedule of this packet transmission over other packets transmission to implement the class of service of the packet.

The system 102A may configure the SD-WAN gateway 112 to classify, split and assign the packet to respective network path based on its classification. This takes place as follows. The very low latency required packets are assigned to the primary network path. The priority queue ensures that these packets get the lower latency of any packets by giving their transmission preference over other packets. The low latency required packets are assigned to the transport which is expected to provide the packet with the lower latency overall latency. The mechanism for determining which path is expected to have lower latency is modified (and made more complex) by the use of the QoS overlay and its priority queue. Specifically, the priority queue ensures that those bulk transfer packets do not significantly impact the latency experienced by higher priority packets. This is achieved by giving higher priority packets a preference without depriving the bulk transfer packets of their allotted bandwidth.

The system 102A may configure the SD-WAN gateway 112 to improve efficiency and reduce processor using a look-up table to determine the appropriate network transport (e.g., primary vs. secondary) for the class of service of the classified packet. Rather than computing the expected latencies of the network transports each time a path selection decision is made, the appropriate path for each class of service may be selected and the selection results stored in the network table. Then, each time a path selection decision is made (e.g., for a connection, an IP flow, a group of packets, or an individual packet), the system 102A may configure the SD-WAN gateway 112 to choose the network path that the network table indicates for the class of service indicated by the classifier.

The system 102A may configure the SD-WAN gateway 112 to pass the assigned and classified packet into the assigned transports priority queue which holds the packet until the rate limiter allows them to be forwarded to a transports tunnel. The rate limiter may include the expected overhead induced by its tunnel. The rate limit may be tuned (by a means external to this technology) to match the expected throughput to be provided by its network transport.

In an example, the system 102A may configure the SD-WAN gateway 112 to determine network capacity of the primary network path 108 and a secondary network path 110 to transmit the latency sensitive packet and the latency agnostic packet for a downstream transmission. The network capacity is determined based on at least one of network status information, the plurality of parameters, latency parameters, network congestion information, forward network queue and a backend network queue based on load on ongoing communication sessions. In an example, the status information includes, but is not limited to, a wireless cell Identity (ID), a satellite spot beam Identity (ID), and/or other type of information received from at least one of the first network transport modem 106-1 or the second network transport modem 106-2, respectively.

In an example, the system 102A may configure the SD-WAN gateway 112 to split the latency sensitive packet and the latency agnostic packet between the primary network path 108 and the secondary network path 110, based on the determined network capacity.

In an example, for splitting the latency sensitive packet and the latency agnostic packet, the system 102A may configure the SD-WAN gateway 112 to select the primary network path 108 for transmitting the latency sensitive packet over the downstream transmission when the determined network capacity of the primary network path 108 may be greater than a threshold value. Further, the system 102A may configure the SD-WAN gateway 112 to select the secondary network path 110 for transmitting the latency agnostic packet over the downstream transmission when the determined network capacity of the secondary network path 110 may be greater than the threshold value.

In an example, the system 102A may configure the SD-WAN gateway 112 to transmit the latency sensitive packet and the latency agnostic packet to a client device, based on the selection.

In an example, the primary network path 108 corresponds to a two-way communication link and the secondary network path 110 corresponds to a one-way communication link. Further, the primary network path 108 corresponds to a terrestrial network, and the secondary network path 110 corresponds to a satellite network.

In an example, the system 102A may configure the SD-WAN gateway 112 to adjust, based on the received status information and the latency parameters, the rate-limited priority queue for a continuity of a transmission control protocol (TCP) connection corresponding to the downstream transmission of the at least one packet, responsive to a change in network conditions of the communication network during the downstream transmission. In an example, the continuity of the TCP connection may be optimized using a TCP Performing Enhancing Proxied (PEP'ed) technique. In an example, the PEP'ed TCP connections includes unacknowledged backbone connection packets that may be carried by a WAN transport (for example, at least one of the first network transport modem 106-1 or the second network transport modem 106-2) that has entered an outage. In an example, the system 102A may shift the unacknowledged backbone connection packets from the WAN transport that is in the outage to a remaining WAN transport that is not in an outage.

The TCP Performance Enhancing Proxied (PEP'ed) technique involves terminating the TCP protocol in the customer premise equipment 104 and the SD-WAN gateway 112. Further, the TCP PEP'ed technique may carry the proxied TCP traffic across the WAN using a WAN-friendly backbone connection. When a WAN that was carrying traffic of the TCP PEP'ed connection, suffers an outage (or severely impaired ability to carry packets), any unacknowledged backbone connection packets are carried via one of the remaining WAN transport's tunnels. This ensures continuity across the frequent brief outages that occur in a mobility setting. This prevents an existing TCP PEP'ed connection from becoming "stuck" during such a single WAN outage.

In an example, the change in the network conditions (in the context of downstream transmission) may be responsive to one or more of, but are not limited to, a spot beam handoff event, throughput or latency of the first network transport modem or the second network transport modem, a level of congestion on at least one of the first network transport modem or the second network transport modem, a destination address and a port address of the wireless path or the satellite path, signal strength or quality to accelerate during the estimation of the available capacity, an upstream or a downstream modulation, a forward error-correcting code (FEC), changes in packet loss, and/or other type of network conditions.

In an example, the system 102A may estimate a latency of the at least one packet. Further, the system 102A may factor the estimated latency of the at least one packet across the at least one of the first network transport modem 106-1 or the second network transport modem 106-2, into the wireless path/tunnel 108 or the satellite network path 110. Furthermore, the system 102A may assign an uncongested latency from the estimated latency of the at least one packet, and a backlog of the at least one packet waiting to be transmitted to the rate-limited priority queue.

In another example, the system 102A may tag the at least one packet with a class of service to provide preference to reduce latency of the at least one packet carrying startup handshake packets associated with a connection.

In another example, the SD-WAN gateway 112 may detect a change in the downstream internet protocol (IP) address and port of the tunnel, and then the SD-WAN gateway 112 may perform downstream transmission of the at least one packet to an updated IP address and a port ID.

In another example, upon being notified of a spot beam shift, the customer premise equipment 104 may immediately transmit one or more upstream transmission packets to the SD-WAN gateway 112. By transmitting the one or more upstream transmission packets, the SD-WAN gateway 112 may immediately detect a change in the downstream internet protocol (IP) and port of the associated WAN transport tunnel. This may allow the SD-WAN gateway 112 to shift its downstream transmissions to the address and port, and in turn limit the duration of the handover induced outage.

Figure 1B:
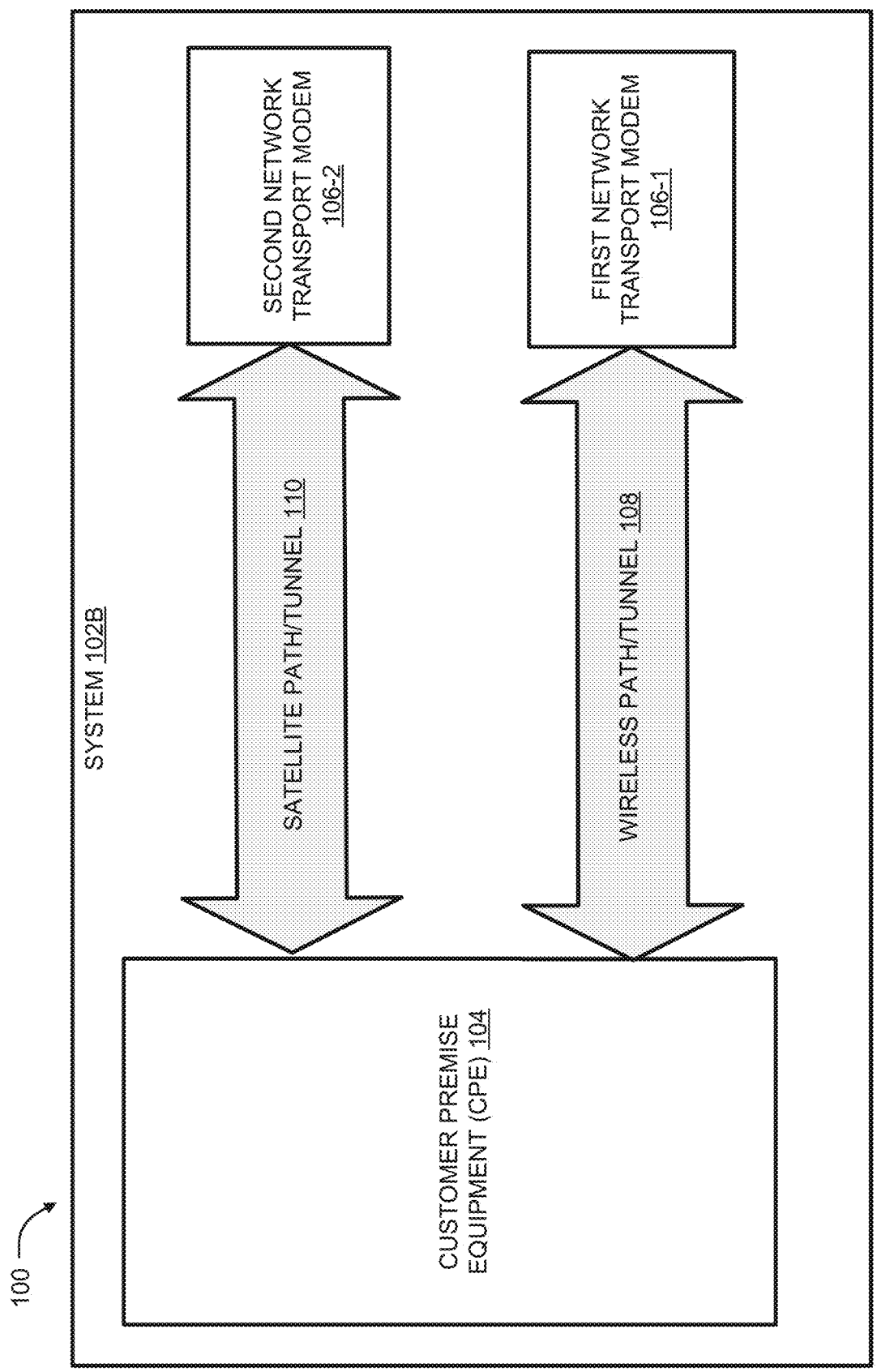
FIG. 1B illustrates an example block diagram representation of a system, which includes a customer premise equipment, a first network transport modem and a second network transport modem, according to an example.

FIG. 1B illustrates an example block diagram representation of a system 102B, which includes a customer premise equipment 104, a first network transport modem 106-1 and a second network transport modem 106-2. The configuration and working of the system 102B may be similar to the system 102A. It should be appreciated that the system 102B depicted in FIG. 1B may be an example. Hence, system 102B may or may not include additional features and some of the features described herein may be removed and/or modified without departing from the scope of the system 102B outlined herein.

In one example, the system 102B includes a customer premise equipment 104, a first network transport modem 106-1, and a second network transport modem 106-2. The first network transport modem 106-1, and the second network transport modem 106-2 may be connected using a network tunneling. The customer premise equipment 104 may use a different tunnel for each network transport modem available. At least one packet is tunneled between the customer premise equipment 104 and the first network transport modem 106-1, and the second network transport modem 106-2 using a Network Address Translation (NAT) protocol.

In an example, the system 102B may be implemented as a standalone device such as a networking apparatus or device. In an example, each of the customer premise equipment 104, the first network transport modem 106-1, and the second network transport modem 106-2 may be implemented as a standalone device. In another example, the customer premise equipment 104, the first network transport modem 106-1, and the second network transport modem 106-2 may be implemented and integrated into an existing network device/network apparatus such as a mobile terminal. The mobile terminal may be used due to more frequent occurrence of outages on one or more wide area network (WAN) connections due to the signal being physically blocked or interfered with (e.g. tunnels, tall buildings, hills, and mountains, and/or other obstacles.), brief outages occurring when shifting from one wireless cell to another spot beam, and/or one wireless cell to another satellite, variations in performance including capacity when shifting from one wireless cell to another spot beam, and/or one wireless cell to another satellite, variations in performance including capacity when the mobile terminal moves from an edge to a center of a spot beam or vice a versa, and/or other mobility scenarios.

In an example, the system 102B may configure the first network transport modem 106-1 and/or the second network transport modem 106-2 to transmit status information and latency parameters. In an example, the status information includes, but is not limited to, a wireless cell Identity (ID), a satellite spot beam Identity (ID), and/or other type of data/IDs.

In an example, any combination of these and other network transports may be used. The example shows the use of two network transports, but more than two transports can be used. In some cases, the techniques can be used with multiple instances of different type of network transport, for example, to provide load balancing between two different network connections.

In an example, the system 102B may configure the customer premise equipment 104 (also referred herein as network apparatus) to download the latency sensitive packet transmitted over the primary network path 108, and the latency agnostic packet transmitted over the secondary network path 110.

In an example, the system 102B may configure the customer premise equipment (CPE) 104 to merge the latency sensitive packet and the latency agnostic packet at real-time in an ongoing session. In an embodiment, the CPE 104 may include a software-based device which receive the latency sensitive packet and the latency agnostic packets and merges them back together as a proxy and present them to the user internet application (the ongoing session) as a single stream. In an example, the ongoing session may be an internet session.

In an example, the system 102B may configure the customer premise equipment 104 to output the merged latency sensitive packet and the latency agnostic packet at the ongoing session. In an example, the system 102B may configure the customer premise equipment 104 to receive status information and latency parameters from at least one of the first network transport modem 106-1 or the second network transport modem 106-2. In an example, the status information includes the wireless cell Identity (ID) received from the first network transport modem 106-1 or the satellite spot beam Identity (ID) received from the second network transport modem 106-2. In an example, the received status information from the first network transport modem 106-1 includes, but is not limited to, connectivity status, the wireless cell ID, an estimated upstream capacity, an estimated downstream capacity, and/or other type of information.

Further, the received status information from the second network transport modem 106-2 includes, but is not limited to, a connectivity status, the spot beam ID, an estimated upstream and a downstream capacity, an upstream modulation, and/or a Forward Error-Correcting Code (FEC) setting, a downstream modulation and/or a Forward Error-Correcting Code (FEC) setting, a downstream signal strength or quality, and/or other type of information. For example, the connectivity status received from the first network transport modem 106-1, is where the SD-WAN gateway 112 may adjust respective path selection to avoid a path with poor or no connectivity. The cell ID is where the SD-WAN gateway 112 may take measurements to update more quickly estimated wireless downstream capacity response to a cell change.

In an example, the status information and the latency parameters include, but are not limited to, an excessive latency, a packet loss, status information from the first network transport modem 106-1 and the second network transport modem 106-2, brief throughput tests when entering a new spot beam or a cell, and/or other type of network coverage areas.

In an example, the system 102B may configure the customer premise equipment 104 to estimate, based on the received status information and the latency parameters, available capacity for the upstream transmission of the at least one packet associated with the at least one of the first network transport modem 106-1 or the second network transport modem 106-2. In an example, the available capacity varies when there may be a change in the spot beam ID or the wireless cell ID. The customer premise equipment 104 may combine respective measurements of upstream estimated capacity along with measurements of a downstream estimated capacity from the SD-WAN gateway 112 to arrive at an upstream and a downstream estimated capacity, respectively.

The customer premise equipment 104 may then send the estimated upstream capacity to the SD-WAN gateway 112. In other examples, the SD-WAN gateway 112 may determine the estimated downstream capacity and send the estimated downstream capacity to the customer premise equipment 104. In another example, the SD-WAN gateway 112 may arrive at the downstream estimated capacity and send the estimated downstream capacity to the customer premise equipment 104. Simultaneously, the customer premise equipment 104 may determine the upstream estimated capacity and send the estimated upstream capacity to the SD-WAN gateway 112. In other example, the computation of the capacity estimate may be distributed between the customer premise equipment 104 and the SD-WAN gateway 112.

Further, the estimated upstream capacity is where the customer premise equipment 104 may incorporate this value into a respective estimate of wireless upstream capacity and thereby adjust the rate limit of a respective priority queue. Additionally, the estimated downstream capacity is where the estimated downstream capacity value may be incorporated into the estimate of the SD-WAN gateway 112 regarding the wireless downstream capacity and thereby adjusting the rate limit of respective priority queues.

For example, the connectivity status of the second network transport modem 106-2 may include a scenario where the SD-WAN gateway 112 may adjust its path selection to avoid a path with poor or no connectivity. Further, the spot beam ID from the second network transport modem 106-2 may include a scenario where the SD-WAN gateway 112 may take measurements to update respective estimated HTS upstream and downstream capacity to respond to a spot beam change more quickly.

Furthermore, the estimated upstream capacity is where the customer premise equipment 104 may incorporate this value into its estimate of HTS upstream capacity, and thereby adjusting the rate limit of the respective priority queue. Additionally, the upstream modulation and/or forward error-correcting code (FEC) setting is where the customer premise equipment 104 may incorporate this value into a respective estimate of HTS upstream capacity, and thereby adjusting the rate limit of a respective priority queue.

Additionally, downstream modulation and/or forward error-correcting code (FEC) setting is where the customer premise equipment 104 forwards the downstream modulation and/or FEC to the SD-WAN gateway 112, which may incorporate this value into an estimate of the SD-WAN gateway 112 of HTS downstream capacity and thereby adjust rate limit of the respective priority queue. Also, the downstream signal strength or quality is where the SD-WAN gateway 112 may use the downstream signal strength or quality to help adjust the downstream HTS capacity estimate, and thereby adjusting the rate limit of the respective priority queue.

Additionally, the excessive latency may be used to adjust estimated WAN capacity. The customer premise equipment 104 and SD-WAN gateway 112 may send time stamped packets to measure both upstream latency and downstream latency, respectively. In an example, the capacity estimate may be increased when the latency remains close to a baseline value while the connection is carrying traffic at a rate close to the estimated capacity. Similarly, the capacity estimate may be decreased when the latency rises significantly above the baseline latency. The actual received bit rate concurrent with increased latency may be used as a factor to produce the reduced capacity estimate.

In another example, the packet loss may be used to adjust the estimated available (WAN) capacity. The tunneling used to carry packets between the customer premise equipment 104 and the SD-WAN gateway 112, in the preferred example, includes sequence numbers that allow the receiver of the tunneled packets to compute a packet loss rate. The customer premise equipment 104 (and the SD-WAN gateway 112) may monitor both packet loss and received throughput across a WAN connection to estimate the available capacity. The customer premise equipment 104 or the SD-WAN gateway 112 presumes that low packet loss indicates that the WAN connection capacity is not overloaded and may adjust its estimate up, when the received rate may be close to the current estimate. The customer premise equipment 104 or the SD-WAN gateway 112 may presume that high packet loss together with a relatively high received throughput indicates that the WAN connection may be saturated and may adjust down its estimated capacity to the received rate seen during the packet loss.

Further, the customer premise equipment 104 may then pass its estimate of capacity based on packet loss to the SD-WAN gateway 112, which may then incorporate that estimate into its estimate of WAN capacity for adjusting a rate limit of a respective priority queue. Similarly, the SD-WAN gateway 112 may then pass its estimate of capacity based on packet loss to the customer premise equipment 104, which may then incorporate that estimate into its estimate of WAN capacity for adjusting the rate limit of respective priority queue for the customer premise equipment 104, and WAN connection combination. In an example, the status information may be used to adjust the estimated available capacity or network capacity. As described earlier, status information may be passed from the second network transport modem 106-2 to the customer premise equipment 104 and from the first network transport modem 106-1 to the customer premise equipment 104, respectively. This status may be used to help adjust estimated available (i.e., WAN) capacity. For example, the system 102B may use changes in signal strength or quality to accelerate (or even restart) the estimation of a WAN connection's upstream and/or downstream capacity. In another example, the system 102B may use changes in spot beam ID or cell ID to accelerate (or even restart) the estimation of a WAN connection's upstream and/or downstream capacity.

Further, the system 102B may use the signaled estimated capacity (upstream and/or downstream) either as an estimate of capacity or as a factor in producing its estimate of capacity. Additionally, the system 102B may use a change in the HTS Upstream or downstream modulation and/or forward error-correcting code (FEC) as an input to adjust the estimate of HTS upstream or downstream capacity. For example, a shift from a rate ¾ to a rate ½ FEC encoding could be used to adjust down the capacity estimate by the appropriate amount (1/3).

Additionally, brief throughput tests may be used to adjust the estimated WAN capacity. A brief (e.g., 3 seconds) throughput test may be used, where the system 102B forces more traffic than a WAN connection may be expected to carry. The system 102B may use the resulting stream of packets (frequently with significant packet loss) to estimate the capacity, for example, by using the measured receive rate as that estimate. Further, brief throughput tests may optionally be performed following an outage and after moving from one spot beam or cell to another spot beam or cell.

When operating with a wireless network with built-in quality of service (QOS), customer premise equipment 104 and SD-WAN gateway 112 may tag each packet with its desired class of service (COS) for example, using the appropriate differentiated services code point (DSCP) code point for each such class of service. The customer premise equipment 104 and the SD-WAN gateway 112, in one example, measure one-way latency, packet loss rate, and rate-limited queue for each class of service. Therefore, customer premise equipment 104 and the SD-WAN gateway 112 estimate a packet's latency based on the estimated throughput and latency of its class of service and the backlog of packets queued for a WAN connection and class of service combination. An alternative example includes sending all packets with the default class of service (e.g., a DSCP of 0) and operating as if the wireless network did not include built-in QoS.

In an example, the system 102B may configure the customer premise equipment 104 to prioritize the interactive traffic data type and the bulk traffic data type across at least one of the first network transport modem 106-1 or the second network transport modem 106-2, using a rate-limited priority queue, based on the estimated available capacity for the upstream transmission of the at least one packet.

In an example, the system 102B may execute the customer premise equipment 104 to adjust, based on the received status information and the latency parameters, the rate-limited priority queue for a continuity of a transmission control protocol (TCP) connection corresponding to the upstream transmission of the at least one packet, responsive to a change in network conditions of the communication network during the upstream transmission.

In an alternate example, the first network transport modem 106-1 may correspond to the mobile wireless modem/terminal or the mobile high-throughput satellite (HTS) modem/terminal, and the second network transport modem 106-2 may correspond to a mobile low earth orbit (LEO) modem/terminal, as a low latency transport. In some examples, the satellite communication may be a geostationary (GEO) high throughput satellite (HTS) system, and/or a low earth orbit (LEO) satellite system.

For example, the connectivity status of the second network transport modem 106-2 may include a scenario where the customer premise equipment 104 may adjust its path selection to avoid a path with poor or no connectivity. Further, a satellite ID from the second network transport modem 106-2 may include a scenario where the customer premise equipment 104 may take measurements to update respective estimated LEO upstream and downstream capacity to respond to a satellite change more quickly.

Furthermore, estimated LEO upstream capacity may be where the customer premise equipment 104 may incorporate this value into its estimate of HTS upstream capacity, and thereby adjusting the rate limit of the respective priority queue. Further, the estimated downstream capacity may be where the customer premise equipment 104 forwards this to the SD-WAN gateway 112 which may incorporate this value into an estimate from the SD-WAN gateway 112, regarding the HTS downstream capacity, and thereby adjusting the rate limit of the respective priority queue. Additionally, the upstream modulation and/or forward error-correcting code (FEC) setting may be where the customer premise equipment 104 may incorporate this value into a respective estimate of HTS upstream capacity, and thereby adjusting the rate limit of a respective priority queue.

Figure 1C:
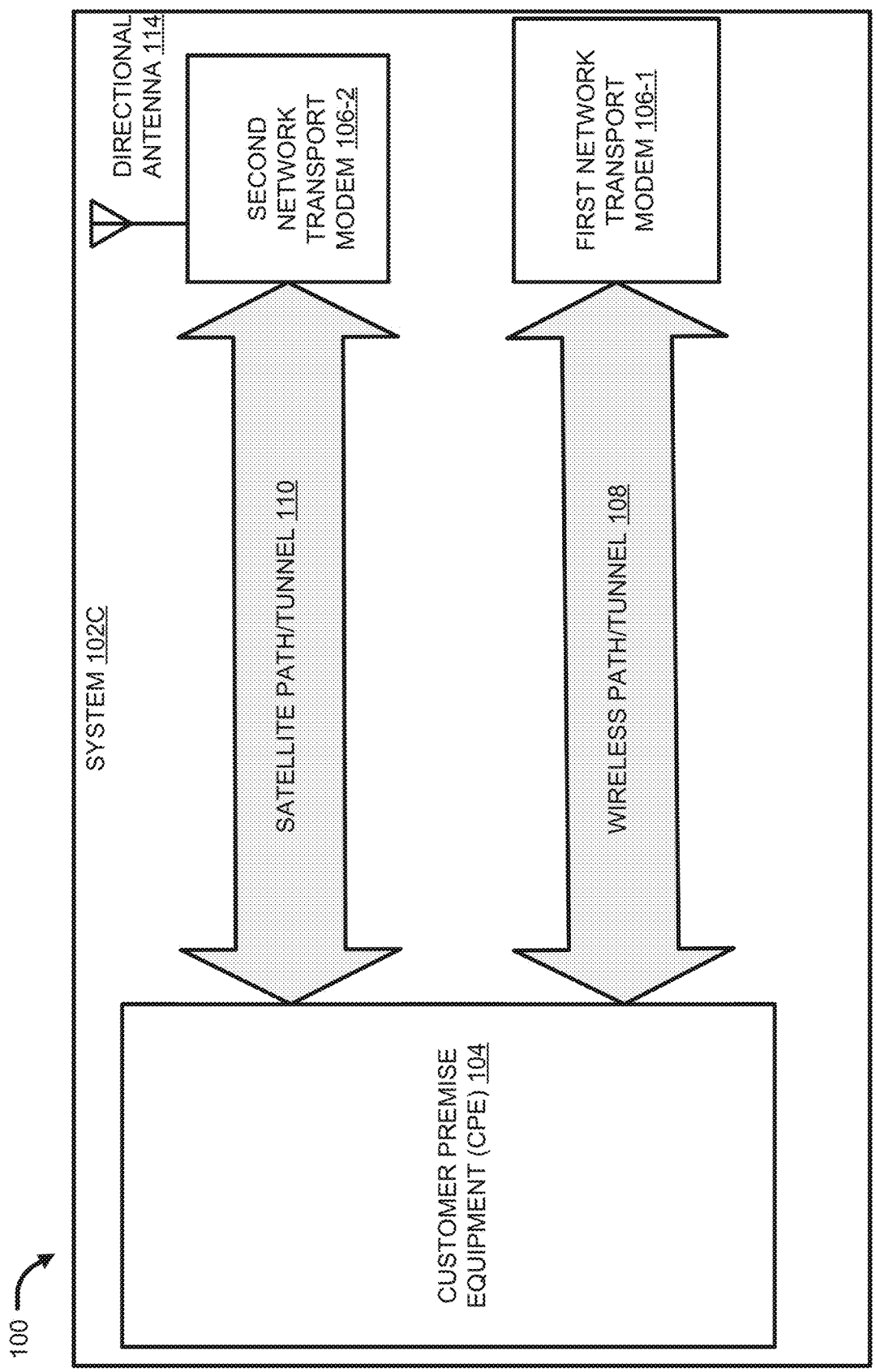
FIG. 1C illustrates an example block diagram representation of a system, which includes a customer premise equipment, a first network transport modem, and a second network transport modem with a directional antenna, according to an example.

FIG. 1C illustrates an example block diagram representation of a system 102C, which includes the customer premise equipment 104, the first network transport modem 106-1, and the second network transport modem 106-2 with a directional antenna 114, according to an example.

Figure 1D:
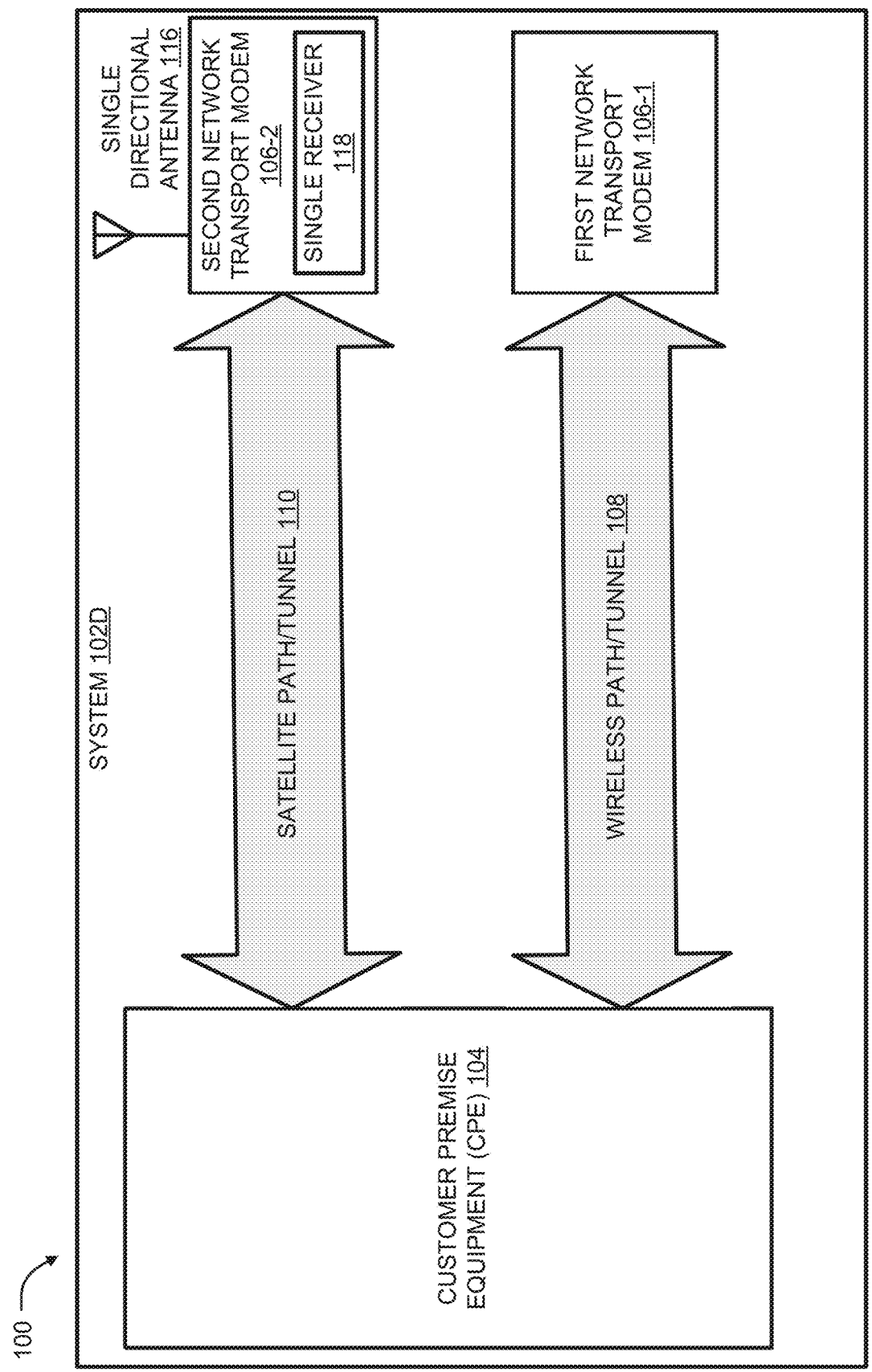
FIG. 1D illustrates an example block diagram representing a system, which includes a customer premise equipment, a first network transport modem, and a second network transport modem with a single antenna and a single receiver, according to an example.

FIG. 1D illustrates an example block diagram representation of a system 102D, which includes the customer premise equipment 104, the first network transport modem 106-1, and the second network transport modem 106-2 with a single directional antenna 116 and a single receiver 118, according to an example.

In an example, the second network transport modem 106-2 may include the single directional antenna 116, to provide a near-hitless handoff from one spot beam to another spot beam. For example, the near-hitless handoff may be a scenario where a handoff causes a WAN transport to briefly (e.g., 20 milli-seconds (ms)) lose connectivity. This may be accomplished by having a single receiver 118 handle reception of the current spotbeam and prepare for a handoff by configuring the single receiver 118 for the carrier in the second spot beam, using the single receiver 118. For example, there may be nearly no outage when a handover/handoff takes place as the single receiver 118 may have already acquired the carrier in the second spotbeam and may immediately handle reception when the handoff takes place. Furthermore, the second network transport modem 106-2 may include only a receiver unit and may not include any transmitter unit. In an example, the second network transport modem 106-2 may correspond to a single-receiver mobile satellite terminal.

The second network transport modem 106-2 may include the single receiver 118 to reduce the outage during spot-beam handoff. The spot beams all emanate from a single satellite; hence a single tracking antenna may be required. Typically satellite terminal has an outdoor unit that only supports a single transmit signal at a time, which also provides the entire spectrum to the indoor unit. One satellite receiver may be used for receiving from the current spot beam while the other may be used for preparing to receive (acquiring) the signal from the next spot beam.

Figure 1E:
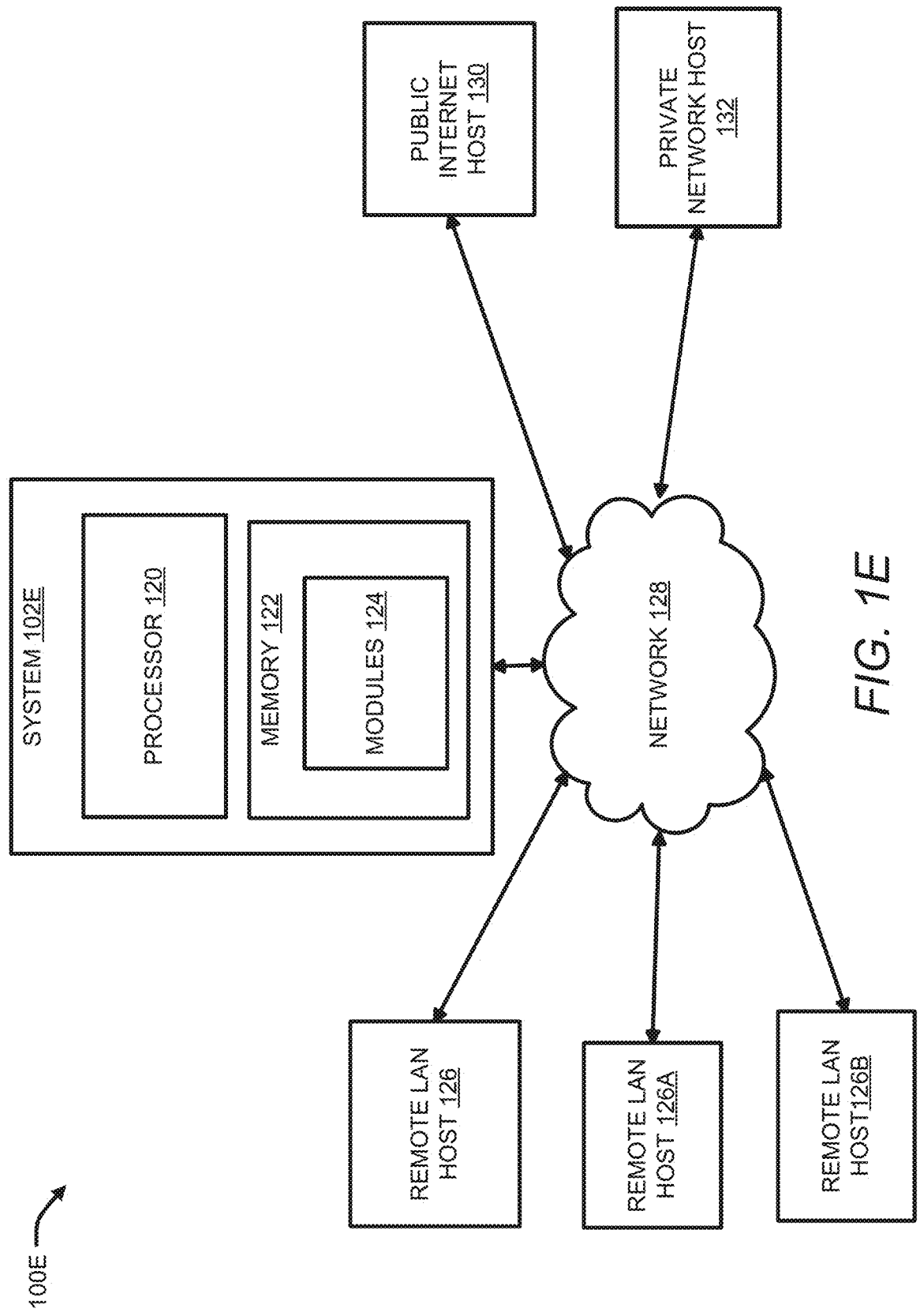
FIG. 1E illustrates an example block diagram representing a network architecture of a system, which includes a processor and a memory comprising modules, according to an example.

FIG. 1E illustrates an example block diagram representation of a network architecture 100E for a system 102E, which includes a processor 120 and a memory 122 comprising modules 124, according to an example.

The network architecture 100E may include a system 102E communicatively connected to a remote local area network (LAN) host 126, 126A, and 126B through a network 128. The network 128 may be, for example, a satellite-based network and/or a wireless-based network. Further, the network architecture 100E may include a public Internet host 130, and a private network host 132. The remote LAN host 126 may communicate with the public Internet host 130 and the private network host 132 via the network 128. The communication involves transmitting data over two different network transport modems, the first network transport modem 106-1 (e.g., wireless technologies, LTE, 4G, 5G, 6G) accessed using a wireless modem (not shown) and the second network transport modem 106-2 (e.g., HTS) accessed using a mobile HTS modem (not shown). However, the use of the two concurrent connections may be transparent to the remote LAN host 126. The remote LAN host 126 may be a host device or endpoint, such as a desktop computer, a laptop computer, a tablet computer, and/or other electronic equipment, to which the customer premise equipment 104 and the SD-WAN gateway 112 provide public Internet access (for example to the public internet host 130 via an internet (not shown)) and private network access (for example to a private network host 132 via a private network intranet (not shown)). Typically, there may be multiple such remote LAN hosts, all of which may concurrently receive network access through the customer premise equipment 104 and the remote LAN(s) (not shown). For example, additional remote LAN hosts 126a, 126b may concurrently transmit and receive data through the customer premise equipment 104 along with the remote LAN host 126.

The system 102E may include a processor 120, and a memory 122. The memory 122 may include processor-executable instructions, which on execution, cause the processor 120 to perform one or more operations described herein. The memory 122 may include one or more modules 124. The modules 124 may include, but are not limited to, a receiving module, a classifier module, an evaluator module, a network capacity determination module, a path splitter module, a transmission module, and/or other modules. Each of these modules, when executed by the processor 120 perform one or more functionalities described in the context of the system 102A, 102B, 102C, and 102D.

For example, the receiving module may receive a plurality of packets for transmission over a first communication network. The plurality of packets are received via the primary network path 108. Additionally, the evaluator module may dynamically evaluate each of the received plurality of packets based on a plurality of parameters. Further, the classifier module may classify each of the plurality of packets into a latency sensitive packet and a latency agnostic packet based on the dynamic evaluation. Further, the network capacity determination module may determine network capacity of the primary network path 108 and a secondary network path 110 to transmit the latency sensitive packet and the latency agnostic packet for a downstream transmission. Furthermore, the path splitter module may split the latency sensitive packet and the latency agnostic packet between the primary network path 108 and the secondary network path 110 based on the determined network capacity.

In an example, for splitting the latency sensitive packet and the latency agnostic packet, the path splitter module may select the primary network path 108 for transmitting the latency sensitive packet over the downstream transmission if the determined network capacity of the primary network path 108 is greater than a threshold value. Further, the path splitter module may select the secondary network path 110 for transmitting the latency agnostic packet over the downstream transmission if the determined network capacity of the secondary network path 110 is greater than the threshold value.

In an example, the transmission module may transmit the latency sensitive packet and the latency agnostic packet to a client device, based on the selection.

In an example, FIG. 1E depicts a process of handling outbound traffic in a customer premise equipment 104 and an SD-WAN Gateway 112. The 112 perform the steps of receiving a packet, classifying the packet to determine latency sensitivity level, selecting one of multiple currently available network transports (e.g., different access networks), splitting the path between the primary network path 108 and the secondary network path 110, tunneling the packet for a tunnel that corresponds to the selected network transport, and transmitting the tunneled packet. The SD-WAN Gateway 112 include a classifier, a path selector module, queues for each network transport, a tunneler for each network transport, and one or more network interfaces. The customer premise equipment 104 has multiple network interfaces, one for each of the network transports or WAN access networks the customer premise equipment 104 is connected to. The SD-WAN Gateway 112 needs only a single WAN interface to transmit packets tunneled for the different network transports.

The customer premise equipment 104 or SD-WAN Gateway 112 receives an outbound packet, that is, a packet to be forwarded through one of its tunnels. The classifier examines the packet and, based on the packet's content and other relevant packets (especially those from the same IP flow), assigns the packet a latency class. For example, the latency class can be selected from among a predetermined set of multiple classes of latency, which can be considered to be in one of the following categories, with optionally multiple priorities or multiple classes of latency within each category:

Category 1: Very Low Latency Required—where this category is assigned to startup handshake packets of Web Browsing connections and other similar IP flows that require very low latency. VOIP IP flows are another example of an IP flow that requires very low latency.

Category 2: Low Latency Required—where this category is assigned to post-startup handshake web browsing packets and the packets of other IP flows, such as for example, VoIP or video conferencing and communication platforms supporting VoIP IP flows, where responsiveness may be important, and the resulting traffic load is not too heavy.

Category 3: Bulk Transfer—where this category is assigned to IP flows where the amount traffic is expected to be heavy enough that they should be carried by the HTS transport. An example of bulk transfer flows include file transfers and streaming video transfers.

The classifier passes the classified outbound packet to the WAN selector which is responsible for assigning the packet to one WAN or the other based on its classification. The WAN selector passes the assigned & classified outbound packet into the assigned transport's queue which holds the packet until the rate limiter allows it to be forwarded to its transport's tunneler. The queue includes a rate limiter that typically includes the expected overhead induced by its tunneler. The rate limit is tuned to match the expected throughput to be provided by its WAN transport.

With this example, the WAN selector or the classifier tags the packet with enough additional information that the peer may re-sequence an IP-flow's packets. This typically involves tagging the packet with a per-IP flow sequence number that increments with each of the flow's packets and optionally an IP flow identifier. The sequence number is specified using enough bits so as to accommodate the maximum difference in delay expected to be experienced by the two WAN transports.

The tunneler (e.g., either for the HTS or LTE transport) prepares the packet for transmission across its WAN to be delivered to its peer. The peer is the other corresponding element of the system, e.g., the peer of the customer premise equipment 104 is the SD-WAN Gateway 112 and the peer of the SD-WAN Gateway 112 is the peer of the customer premise equipment 104. This typically involves "tunneling" the packet, which means having the packet be carried as the payload of another packet. The tunneled packet includes the resequencing information determined for that packet by the WAN selector or classifier.

The tunneler passes the tunneled packet to its transport network interface. For the SD-WAN gateway 112, this means transmitting the packet using the HTS interface ("I/F") a or the LTE I/F depending on which WAN was chosen by the WAN selector. The network interface then actually transmits the packet so that it gets carried through the access network on route to the peer.

Figure 1F:
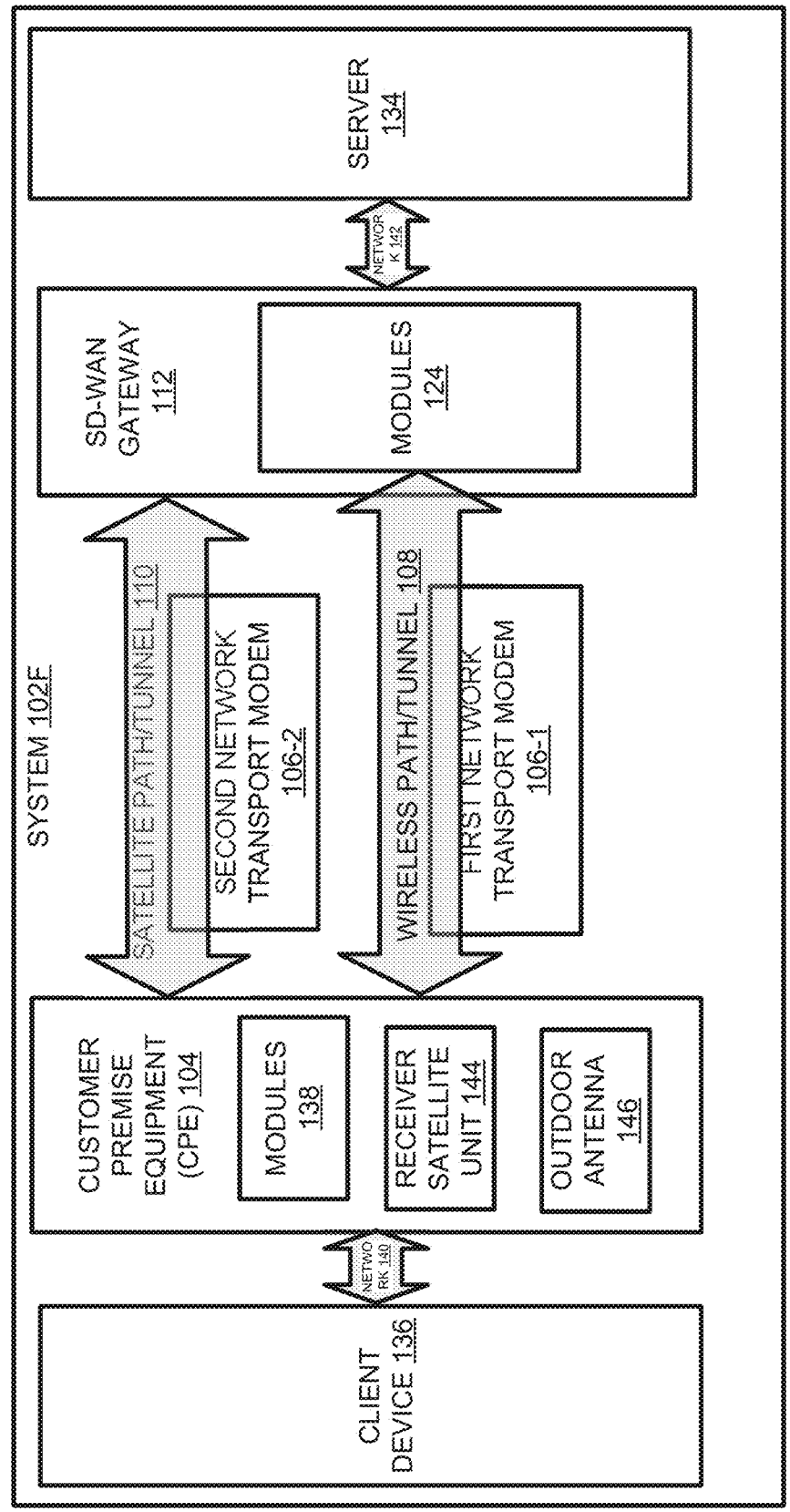
FIG. 1F illustrates an example block diagram of an asymmetric network environment, such as those shown in FIG. 1A, depicting various components of the system, according to an example.

FIG. 1F illustrates a block diagram of an asymmetric network environment 100F, such as those shown in FIG. 1A, depicting various components of the system 102, according to an example. The asymmetric network environment 100F may include a server 134 communicatively coupled to the SD-WAN gateway 112 via a network 142. The network 142 may be a public network host or a private network host, such as those depicted in FIG. 2.

Further, the SD-WAN gateway 112 may be communicatively coupled to the customer premise equipment 104 via a first network transport modem 106-1 and a second network transport modem 106-2. The customer premise equipment 104 may further be connected to the client device 136 (also referred herein as remote LAN host) via a network 140.

The SD-WAN gateway 112 may include the plurality of modules 124 for managing the network communication in the asymmetric network environment 100F. The plurality of modules 124 are similar to those shown in FIG. 1E.

The customer premise equipment 104 may include plurality of modules 138 for managing the downstream transmission received from the SD-WAN gateway 112. The customer premise equipment 104 may include a processor (not shown in FIG. 1F), and a memory (not shown in FIG. 1F). The memory may include processor-executable instructions, which on execution, cause the processor to perform one or more operations described herein. The memory may include the plurality of modules 138. The modules 138 may include, but are not limited to, a downloader module, a combiner module, an output module, and/or other modules. Each of these modules 138, when executed by the processor, perform one or more functionalities described in the context of the customer premise equipment 104A, 104B, 104C, and 104D.

For example, the downloader module may download the latency sensitive packet transmitted over the primary network path 108, and the latency agnostic packet transmitted over the secondary network path 110. Further, the combiner module may merge the latency sensitive packet and the latency agnostic packet at real-time in an ongoing session. Furthermore, the output module may output the merged latency sensitive packet and the latency agnostic packet at the ongoing session. The customer premise equipment 104 may include an outdoor receiver satellite unit 144 and an outdoor terrestrial antenna 146. The primary network path 108 corresponds to a terrestrial network, and the secondary network path 110 corresponds to a satellite network. The primary network path 108 corresponds to a two-way communication link and the secondary network path 110 corresponds to a one-way communication link.

In an example, the client device 136 and the server 134 are generally remote from each other and typically interact through a communication network. The relationship of the client 136 and the server 134 arises by virtue of computer programs running on the respective computers and having a client-server relationship with each other.

The client device 136 may be a client computer having a graphical user interface or a Web browser through which a user can interact with an implementation of the invention, or any combination of one or more such back end, middleware, or front-end components. The components of the system can be interconnected by any form or medium of digital data communication, e.g., a communication network. Examples of communication networks include a local area network ("LAN") and a wide area network ("WAN"), e.g., the Internet.

Figure 2:
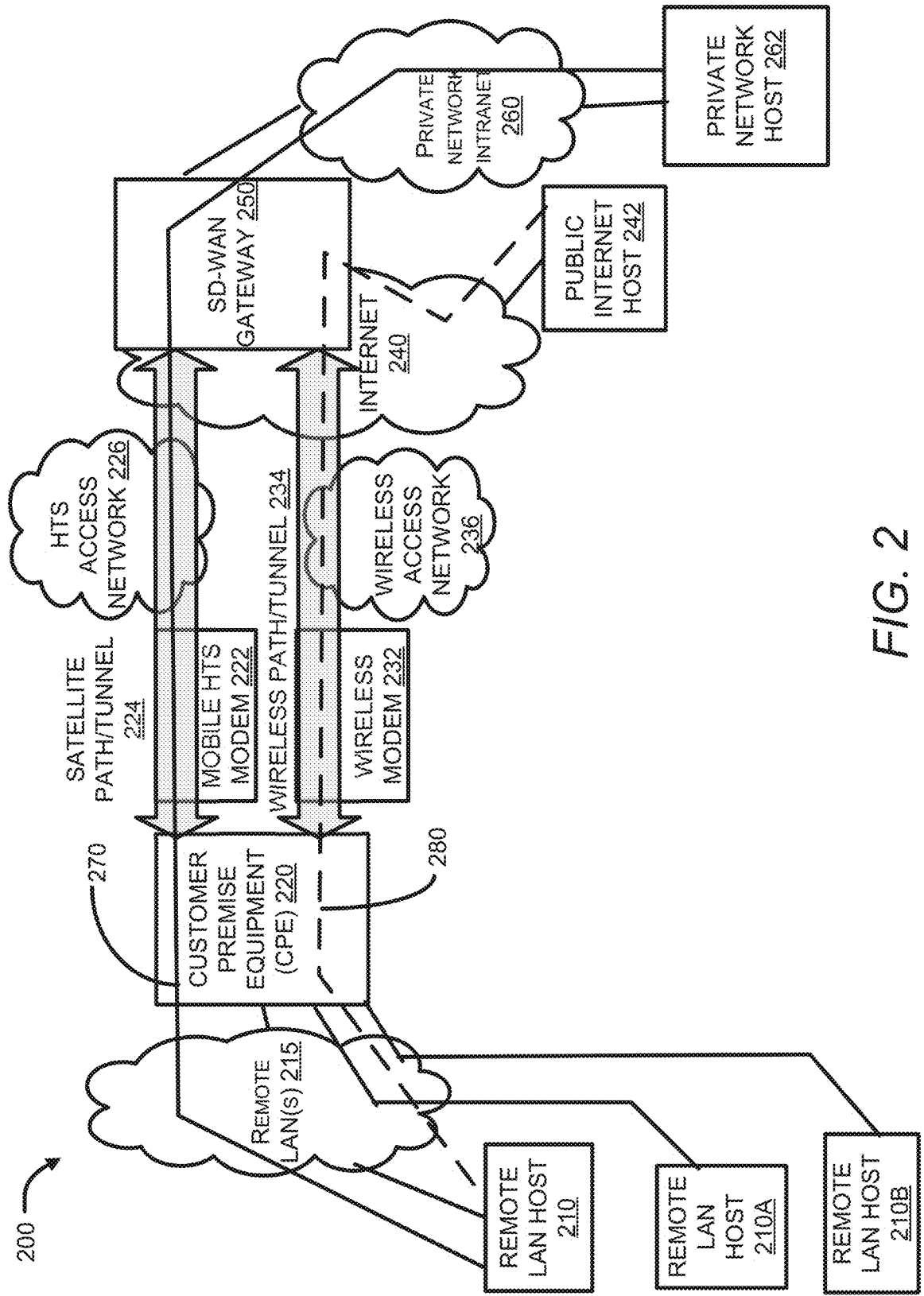
FIG. 2 illustrates an example block diagram representing a software-defined wide area network (SD-WAN) architecture, according to an example.

FIG. 2 illustrates a block diagram representing a software-defined wide area network (SD-WAN) architecture 200, according to an example. While an example of FIG. 2 and other examples herein involve two specific network transport modems, e.g., a mobile high-throughput satellite (HTS) modem 222 (e.g., the second network transport modem 106-2 shown in FIGS. 1A and 1B) and a mobile wireless modem 232 (e.g., the first network transport modem 106-1 shown in FIGS. 1A, and 1B), other physical network access technologies or network transport modems may be used, e.g., coaxial cable, fiber-optics, digital subscriber line (DSL), LTE, 5G, 6G, cellular, and/or other wireless technologies. Any combination of these and other network transport modems may be used. This example shows the use of two network transport modems; however more than two transport modems may be used based on implementation requirements. In some scenarios, the techniques may be used with multiple instances of the different type of network transport modem, for example, to provide load balancing among two network connections of the different type (e.g., two different cable Internet connections).

The example of FIG. 2 includes a remote Local area network (LAN) host 210 that communicates with a public internet host 242 and a private network host 262. The communication involves transmitting data over two different network transport modems, a first network transport modem (e.g., wireless technologies, LTE, 4G, 5G, 6G) accessed using a wireless modem 232 and a second network transport (e.g., HTS) accessed using a mobile HTS modem 222. However, the use of the two concurrent connections may be transparent to the remote LAN host 210. The two transport modems may be managed by a customer premise equipment 220 (similar to customer premise equipment 104 shown in FIG. 1B) and a SD-WAN gateway 250 similar to SD-WAN gateway 112 shown in FIG. 1A) as discussed below.

When the network host 210 sends data packets to transmit, the SD-WAN gateway 250 evaluates the packets and network conditions to determine which network transport to use (e.g., the mobile HTS modem or the wireless modem) for each packet or a group of packets. For example, the SD-WAN gateway 250 may classify packets to specify classes of service (e.g., levels of latency) needed for each packet, and then split the path to select the most appropriate of the available network transport modems given the class of service. The SD-WAN gateway 250 then sends each packet to the customer premise equipment 220 using the selected network transport modem for the packet, and the customer premise equipment 220 sends the packets to the appropriate remote LAN hosts 210. A similar, complementary process may be used to transmit data in the return direction from the customer premise equipment 220 to the SD-WAN gateway 225 and back to the network host. As a result of this technique, the customer premise equipment 220 and the SD-WAN gateway 250 may make use of the concurrently available network transport modems to achieve the features of each.

In an example, the customer premise equipment 220, the mobile HTS modem 222, and the wireless modem 232 may be implemented as a mobile terminal (or simply, the terminal). The functionality of the customer premise equipment 220, the mobile HTS modem 222, and the wireless modem 232 may be implemented in a single hardware equipment such as a mobile terminal or a networking apparatus/device.

The remote LAN host 210 may be a host device or endpoint, such as a desktop computer, a laptop computer, a tablet computer, and/or other electronic equipment, to which the customer premise equipment 220 and the SD-WAN gateway 250 provide public Internet access (for example to a public internet host 242 via an internet 140) and private network access (for example to a private network host 262 via a private network intranet 260). Typically, there may be multiple such remote LAN hosts, all of which may concurrently receive network access through the customer premise equipment 220 and the remote LAN(s) 215. For example, additional remote LAN hosts 210a, and 210b may concurrently transmit and receive data through the customer premise equipment 220 along with the remote LAN host 210.

The mobile HTS modem 222 and an HTS access network 226 provide HTS access to the public Internet. The wireless modem 232 and the wireless access network 236 provide wireless access to the public Internet.

Further, the remote LAN(s) 215 connect the remote LAN host 210 to the customer premise equipment 220. The customer premise equipment 220 utilizes multiple of broadband transports to provide wide-area-network (WAN) connectivity to the remote LAN hosts 210, 210a, and 210b. The customer premise equipment 220 may forward packets to/from the remote LAN hosts 210, 210a, and 210b to/from the SD-WAN gateway 250 flexibly over the transport modems.

The SD-WAN architecture 200 uses network tunneling to connect the customer premise equipment 220 and the SD-WAN gateway 250. The customer premise equipment 220 and the SD-WAN gateway 250 may use a different tunnel for each network transport modem. A primary network path, a wireless path/tunnel 234 (similar to wireless path/tunnel 108 shown in FIGS. 1A and 1B) may be established for packets exchanged over the wireless transport modem 232, and a secondary network path, a satellite path/tunnel 224 (similar to the secondary network path 110 shown in FIGS. 1A and 1B), may be established for packets exchanged over the mobile HTS transport modem 222. The satellite path/tunnel 224 and the wireless path/tunnel 234 represent the ability of the customer premise equipment 220 and the SD-WAN gateway 250 to forward packets to each other. The satellite path/tunnel 224 and the wireless path/tunnel 234 may be internet protocol security (IPsec) tunnels when privacy may be required as when private network access may be required or may be a user datagram protocol (UDP) based tunneling mechanism (e.g., unencrypted) when privacy may not be required.

Alternatively, there could be another tunneling mechanism or networking mechanism for relaying packets between the customer premise equipment 220 and the SD-WAN gateway 250 over their specific access network. In general, traffic for the satellite path/tunnel 224 may be sent exclusively over the mobile HTS modem 222, and traffic for the wireless path/tunnel 234 may be sent exclusively over the wireless modem 232.

In an example, one or more packets are tunneled between the customer premise equipment 220 and the SD-WAN gateway 250 using a Network Address Translation (NAT) protocol. The SD-WAN gateway 250 may detect a source Internet Protocol (IP) address of the tunnel. Further, the SD-WAN gateway 250 may detect a change in the port ID. The SD-WAN gateway 250 may perform the downstream transmission of the at least one packet to an updated IP address and the port ID of the tunnel. For example, each satellite gateway through which a spot beam may be carried typically performs a Network Address Translation (NAT) operation on data traffic. When a spot beam handoff occurs, all operating transmission control protocol (TCP) (and User Datagram Protocol (UDP)) connections are lost. This may be due to the downstream Internet Protocol (IP) address seen by host devices on a public internet that changes as a result of the movement from one spot beam satellite gateway to the next spot beam satellite gateway.

The systems and methods herein overcome the problem of losing the connections, by using a NAT traversal-friendly tunneling protocol (e.g., IPsec with NAT traversal) to tunnel packets between the customer premise equipment 220 and the SD-WAN gateway 250. When the SD-WAN gateway 250 receives the downstream IP address and port for an HTS tunnel change, the SD-WAN gateway 250 switches the destination address and port of that tunnel's downstream packets, so that as soon as any upstream packet may be carried after a spot beam handoff, the downstream traffic may also be carried to the switched spot beam.

In a preferred example, the customer premise equipment 220 may receive status information indicating that a handoff has occurred. The customer premise equipment 220 may periodically send a stream of upstream packets until a downstream packet carried by the new spot beam may be received to facilitate the SD-WAN gateway 250 switchovers of downstream packets to get through a satellite gateway of the new spot beam.

The SD-WAN gateway 250 terminates tunnels 224, and 234 and has the ability to flexibly forward packets to and from the remote LAN hosts 210, 210a, and 210b over the satellite tunnel 224 and wireless tunnel 234 via the customer premise equipment 220. The SD-WAN gateway 250 may forward packets to and from a private network intranet 260 and its hosts when private network connectivity is being provided. The SD-WAN gateway 250 may forward packets to and from the public internet 240 and its hosts (optionally by performing a Network Address Translation function) when public internet access is provided.

The customer premise equipment 220 and SD-WAN gateway 250 together implement SD-WAN policies that provide for identifying and classifying unidirectional IP flows and then selecting which tunnel (satellite tunnel 224 or wireless tunnel 234) should carry the IP flow based on the policy and the flow's classification and the measured performance of the WAN transports. Two network connections 270, and 280 are shown in the example diagram, however, tunnels 224, and 234 may concurrently support transfers for many different connections, including connections between different LAN hosts.

The example shows a first network connection 270 (e.g., a transmission control protocol (TCP) connection), which may include a pair of unidirectional IP flows, which connects the remote LAN host 210 to the private network host 262, where the SD-WAN policies determine to carry the flow's packets over the satellite path/tunnel 224 and thus via an HTS broadband transport.

The SD-WAN architecture 200 also illustrates a second connection 280 (e.g., the TCP connection), which may include a pair of unidirectional IP flows, which connects the remote LAN host 210 to the public network host 242, where the SD-WAN policies determine to carry the flow's packets over the wireless tunnel 234 and thus via a wireless broadband transport. The policy's selection of the WAN or WANs that should carry an IP flow's packets may shift over time.

In the SD-WAN architecture 200, the customer premise equipment 220 and SD-WAN gateway 250 may classify traffic and assign it to different tunnels 224, and 234 at different levels of granularity. For example, tunnels 224, and 234 for traffic may be assigned for a connection 270, and 280, on an IP flow basis (e.g., for each IP flow with a connection being assigned separately), for groups of packets, or individual packets. After traffic may be assigned to a tunnel, the customer premise equipment 220 and the SD-WAN gateway 150 may periodically re-evaluate the assignment. In some cases, the re-evaluation occurs periodically, for example, after a predetermined interval of time or after a predetermined amount of data for the connection or IP flow may be received or transmitted. In some implementations, the customer premise equipment 220 and the SD-WAN gateway 250 may each evaluate data to be transmitted on an individual packet-by-packet basis or as groups of packets. As a result, as incoming packets of a connection are received, each packet or group of packets may be newly evaluated in view of current network conditions (including the queue depths of the different tunnels 224, 234) and may be assigned to achieve improved overall performance, e.g., lower latency, or other metric, which may vary based on the class of service indicated by the classification of the packets.

As an example, although connection 280 may be initially assigned to the wireless tunnel 234 as illustrated, network conditions may change, e.g., due to changing a throughput or latency of one of the network transports, changing a level of congestion on one of the network transports, etc. The transmission queue for the wireless tunnel 234 may increase to the point that the overall expected latency, e.g., the time between adding a packet to the transmission queue and receipt of the packet at the SD-WAN gateway 250, may be higher for the wireless modem 232 than for the mobile HTS modem 222. As a result, some, or all the data for the connection 280 may be assigned to the satellite tunnel 224 for the mobile HTS modem 222. In this way, data for the connection 280 may be carried on either transport modems that provide a better latency, or may be carried on (e.g., split across) a combination of multiple transport modems to achieve improved overall performance.

This technology provides for optimized public internet access or optimized private network access where two internet connections are utilized. (a mobile HTS connection and a wireless connection), where IP flows are classified (and perhaps dynamically reclassified) so that bulk transfers are carried (typically the HTS connection) and so that the interactive traffic may be carried by wireless connection alone, so that the latency during a handoff is seamless.

The disclosed technology extends the functionality of an SD-WAN solution with a QoS overlay which leverages the QoS provided by an HTS access network and provides for QoS over the wireless access network. It optimizes Interactive Traffic in several ways. First, the customer premise equipment 220 or gateway 250 may cause a startup handshake packet (or startup set of packets) of an Interactive IP-flow to be carried over wireless access network with a very high-priority (e.g., very low-latency) class-of-service. Second, the customer premise equipment 220 or gateway 250 may cause a non-startup handshake packet of an Interactive IP-flow to be carried with a high-priority (low-latency) class-of-service, but potentially one which has a lower priority than the startup handshake class of service. This non-startup handshake packet may be sent over the network transport or access network which may be estimated to provide lower latency for that packet.

In an example, the estimation may be based on a combination of one or more of the following: (i) the estimated lightly loaded or baseline latency of the access network, (ii) the estimated throughput available to carry packets at this particular class-of-service, and (iii) the total amount of data represented by the packets at that class of service which are queued up awaiting transmission. In other words, the estimation may consider the time needed to clear the transmission queue for a specific class of service on a specific network transport to determine the latency most likely to be experienced. Third, on the receiving end of the two tunnels 224 and 234, the receiving device (e.g., either the customer premise equipment 220 or gateway 250) may enable packets of the IP flow back in sequence when its packets are carried by multiple tunnels.

The customer premise equipment 220 and the SD-WAN gateway 250 may assign bulk transfer IP flows to be carried over the transport, at a lower-priority class of service, to reduce the impact of the bulk traffic on the latency experienced by the high-priority (e.g., low-latency) classes of service.

The disclosed technology includes provisions for monitoring wireless usage against usage limits and for incrementally reducing the fraction of traffic carried via wireless as the usage limits are approached. One technique for reducing that usage may be increasingly overestimating the latency that an interactive packet should expect from the wireless access network. Another technique may be increasing the priority levels which are carried over the transport (e.g., HTS) and adjusting (e.g., typically reducing) the amount of data carried by an IP flow for the transport (e.g., wireless modem) prior to its demotion to such a level. A third technique involves progressively underestimating the capacity of the wireless connection.

Although customer premise equipment 220 and the SD-WAN gateway 250 are described as being implemented through SD-WAN techniques, this is only one example. The customer premise equipment 220 and the SD-WAN gateway 250 may optionally be implemented without SD-WAN techniques.

The disclosed technology may be implemented for managing a handoff in a software-defined wide area network (SD-WAN) in aero or mobility situations, where a terminal may be switching across multiple high throughput satellite (HTS), low-latency wireless spot beams, and cells.

The SD-WAN architecture 200 may use an agile switched agile-switching active-path (ASAP) technique in aero or mobility situations. The SD-WAN architecture 200 may be specifically adapted to aero, maritime, and land mobile settings where a terminal may be shifting occasionally from one spot beam to another spot beam, and/or one satellite to another satellite, or shifting from one wireless cell to another cell.

Figure 3:
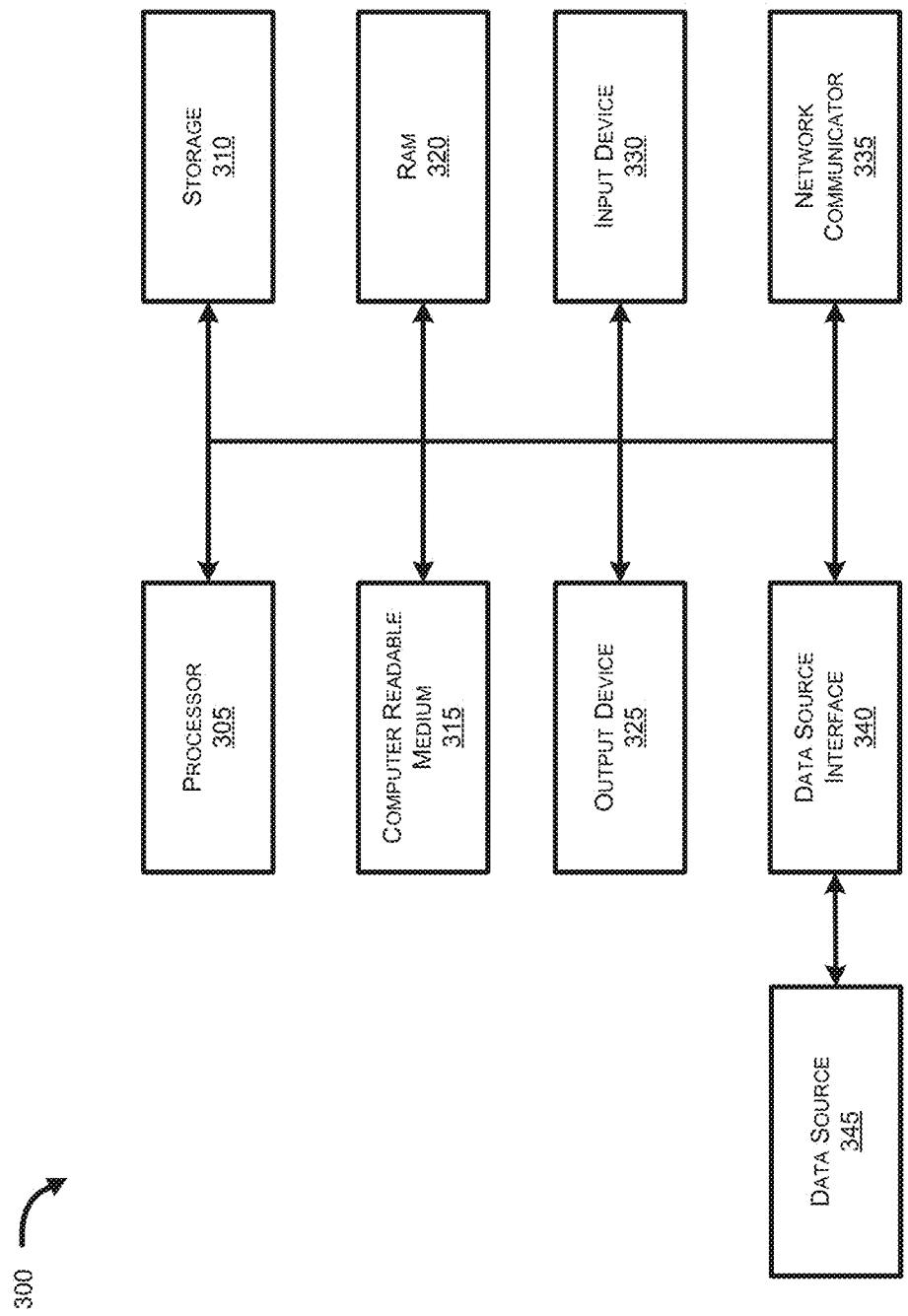
FIG. 3 illustrates an example block diagram representing a computer system, according to an example.

FIG. 3 illustrates an example block diagram representation of a computer system 300, according to an example. The computer system 300 may be part of or any one of the system 102, the customer premise equipment 104, the SD-WAN gateway 112, and the network transport modems 106, as shown in the network architecture 100 to perform the functions and features described herein. The computer system 300 may include, among other things, an interconnect, a processor 305, a storage 310, a computer readable medium 315, a RAM 320, an output device 325, an input device 330, a data source 345, a data source interface 340, and a network communicator 335.

The interconnect (not shown in FIG. 3) may interconnect various subsystems, elements, and/or components of the computer system 300. As shown, the interconnect may be an abstraction that may represent any one or more separate physical buses, point-to-point connections, or both, connected by appropriate bridges, adapters, or controllers. In some examples, the interconnect may include a system bus, a peripheral component interconnect (PCI) bus or PCI-Express bus, a Hyper Transport or industry standard architecture (ISA)) bus, a small computer system interface (SCSI) bus, a universal serial bus (USB), IIC (I2C) bus, or an Institute of Electrical and Electronics Engineers (IEEE) standard 1394 bus, or "firewire," or other similar interconnection element.

In some examples, the interconnect may allow data communication between the processor 305 and system memory, which may include read-only memory (ROM) or flash memory (neither shown), and random-access memory (RAM) 320. It should be appreciated that the RAM 320 may be the main memory into which an operating system and various application programs may be loaded. The ROM or flash memory may contain, among other code, the Basic Input-Output system (BIOS) which controls basic hardware operation such as the interaction with one or more peripheral components.

The processor 305 may be the central processing unit (CPU) of the computing device and may control the overall operation of the computing device. In some examples, the processor 305 may accomplish this by executing software or firmware stored in system memory or other data via the storage 310. The processor 305 may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices.

The multimedia adapter (not shown in FIG. 3) may connect to various multimedia elements or peripherals. These may include a device associated with visual (e.g., video card or display), audio (e.g., sound card or speakers), and/or various input/output interfaces (e.g., mouse, keyboard, touchscreen).

The network communicator 335 may provide the computing device with an ability to communicate with a variety of remove devices over a network and may include, for example, an Ethernet adapter, a Fiber Channel adapter, and/or another wired- or wireless-enabled adapter. The network communicator 335 may provide a direct or indirect connection from one network element to another and facilitate communication between various network elements.

The storage 310 may connect to a standard computer-readable medium for storage and/or retrieval of information, such as a fixed disk drive (internal or external).

Many other devices, components, elements, or subsystems (not shown) may be connected in a similar manner to the interconnect or via a network. Code or computer-readable instructions to implement the dynamic approaches for payment gateway selection and payment transaction processing of the systems and methods may be stored in computer-readable storage media such as one or more of system memory or other storage. Code or computer-readable instructions to implement the dynamic approaches for payment gateway selection and payment transaction processing of the systems and methods may also be received via one or more interfaces and stored in memory. The operating system provided on computer system 300 may be MS-DOS®, MS-WINDOWS®, OS/2®, OS X®, IOS®, ANDROID®, UNIX®, Linux®, or another operating system.

Figure 4:
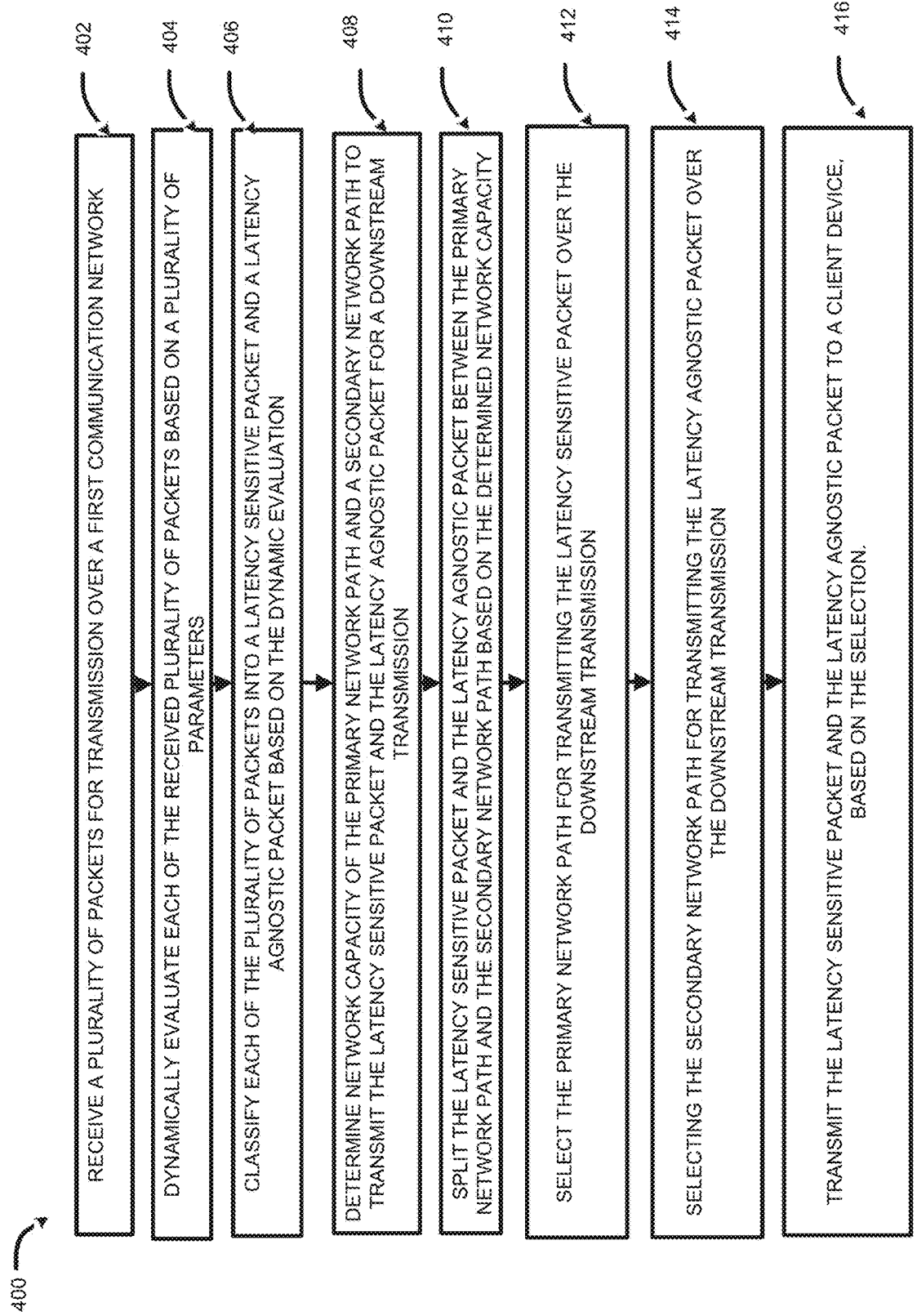
FIG. 4 illustrates an example flow diagram representation of a method for managing network communication in an asymmetric network environment, according to an example.

FIG. 4 illustrates an example flow diagram representation of a method 400 for managing network communication in an asymmetric network environment, according to an example. The disclosed method 400 may be performed by one or more components of the system (102A, 102B, 102C, 102D, 102E) disclosed herein. For example, with reference to FIG. 1E, the steps disclosed herein may be performed by a processor 120. In yet another example, some of the steps disclosed herein may be performed by the SD-WAN gateway 112.

At block 402, the method 400 may include receiving, by the processor 120, a plurality of packets for transmission over a first communication network. The plurality of packets are received via a primary network path 108.

At block 404, the method 400 may include dynamically evaluating, by the processor 120, each of the received plurality of packets based on a plurality of parameters.

At block 406, the method 400 may include classifying, by the processor 120, each of the plurality of packets into a latency sensitive packet and a latency agnostic packet based on the dynamic evaluation.

At block 408, the method 400 may include determining, by the processor 120, network capacity of the primary network path 108 and a secondary network path 110 to transmit the latency sensitive packet and the latency agnostic packet for a downstream transmission.

At block 410, the method 400 may include splitting, by the processor 120, the latency sensitive packet and the latency agnostic packet between the primary network path and the secondary network path based on the determined network capacity.

At block 412, the method 400 may include selecting, by the processor 120, the primary network path 108 for transmitting the latency sensitive packet over the downstream transmission, when the determined network capacity of the primary network path is greater than a threshold value.

At block 414, the method 400 may include selecting, by the processor 120, the secondary network path 110 for transmitting the latency agnostic packet over the downstream transmission when the determined network capacity of the secondary network path 110 is greater than the threshold value.

At block 416, the method 400 may include transmitting, by the processor 120, the latency sensitive packet and the latency agnostic packet to a client device, based on the selection.

The order in which the method 400 is described is not intended to be construed as a limitation, and any number of the described method blocks may be combined or otherwise performed in any order to implement the method 400 or an alternate method. Additionally, individual blocks may be deleted from the method 400 without departing from the spirit and scope of the ongoing description. Furthermore, the method 400 may be implemented in any suitable hardware, software, firmware, or a combination thereof, that exists in the related art or that is later developed. The method 400 describes, without limitation, the implementation of the system 102. A person of skill in the art will understand that method 400 may be modified appropriately for implementation in various manners without departing from the scope and spirit of the ongoing description.

Various examples of systems and methods for managing network communication in an asymmetric network environment, especially where a terminal may be switching across multiple high throughput satellite (HTS), low-latency wireless spot beams and cells, may be provided. Various example implementations of the disclosed approach herein may provide systems and methods for seamless handoff of spot beam and cells in an aero, a maritime, and land mobile setting, where a terminal may shift occasionally from one wireless cell to a geostationary earth orbit (GEO) spot beam, and/or from one wireless cell to one low earth orbit (LEO) satellite. Furthermore, the system and method may combine a spot beam transport modem with a low latency wireless transport modem in mobility situations. Additionally, the system and method may provide a persistence of continuity of end-user transmission control protocol (TCP) and other traffic across a high throughput satellite (HTS) spot beam handoff. Furthermore, the system and method may adjust rate limiters for TCP continuity and estimate available capacity of upstream and downstream transmission of packets across each WAN transport modem.

In an example, network capacity determination may be based on packet loss as evidence of overdriving a WAN transport modem and using the throughput achieved in the presence of packet loss as a measure of the available capacity of the WAN transport modem. Furthermore, the system and method may provide a continuity of a performing enhancing proxied (PEP'ed) TCP connections across a single WAN transport outage. Additionally, the systems and methods may allow responsiveness of the wireless transport modem for high interactive applications using wireless transport modem and higher capacity of the satellite transport modem for bulk transfers.

The present system provides a smaller receive-only outdoor terrestrial antenna and a simpler hub equipment (such as outdoor receiver satellite unit) over traditional VSAT providers which would eliminate the need for all in route or satellite return RF and baseband processing equipment.

One of ordinary skill in the art will appreciate that techniques consistent with the ongoing description are applicable in other contexts as well without departing from the scope of the ongoing description.

As mentioned above, what is shown and described with respect to the systems and methods above are illustrative. While examples described herein are directed to configurations as shown, it should be appreciated that any of the components described or mentioned herein may be altered, changed, replaced, or modified, in size, shape, and numbers, or material, depending on application or use case, and adjusted for managing network communication.

It should also be appreciated that the systems and methods, as described herein, may also include, or communicate with, other components not shown. For example, these may include external processors, counters, analyzers, computing devices, and other measuring devices or systems. This may also include middleware (not shown) as well. The middleware may include software hosted by one or more servers or devices. Furthermore, it should be appreciated that some of the middleware or servers may or may not be needed to achieve functionality. Other types of servers, middleware, systems, platforms, and applications not shown may also be provided at the back end to facilitate the features and functionalities of the testing and measurement system.

Moreover, single components may be provided as multiple components, and vice versa, to perform the functions and features described herein. It should be appreciated that the components of the system described herein may operate in partial or full capacity, or it may be removed entirely. It should also be appreciated that analytics and processing techniques described herein with respect to the optical measurements, for example, may also be performed partially or in full by other various components of the overall system.

It should be appreciated that data stores may also be provided to the apparatuses, systems, and methods described herein, and may include volatile and/or nonvolatile data storage that may store data and software or firmware including machine-readable instructions. The software or firmware may include subroutines or applications that perform the functions of the measurement system and/or run one or more application that utilize data from the measurement or other communicatively coupled system.

The various components, circuits, elements, components, and interfaces may be any number of mechanical, electrical, hardware, network, or software components, circuits, elements, and interfaces that serves to facilitate communication, exchange, and analysis data between any number of or combination of equipment, protocol layers, or applications. For example, the components described herein may each include a network or communication interface to communicate with other servers, devices, components or network elements via a network or other communication protocol.

Although examples are directed to satellite communication systems, such as high throughput satellite (HTS) systems, it should be appreciated that the systems and methods described herein may also be used in other various systems and other implementations. For example, these may include other various telecommunication test and measurement systems. In fact, there may be numerous applications in cable or optical communication networks, not to mention fiber sensor systems that could employ the systems and methods as well.

It should be appreciated that the systems and methods described herein may also be used to help provide, directly or indirectly, measurements for distance, angle, rotation, speed, position, wavelength, transmissivity, and/or other related tests and measurements.

What has been described and illustrated herein are examples of the implementation along with some variations. The terms, descriptions, and figures used herein are set forth by way of illustration only and are not meant as limitations. Many variations are possible within the scope of the implementations, which is intended to be defined by the following claims—and their equivalents—in which all terms are meant in their broadest reasonable sense unless otherwise indicated.

The invention claimed is:

1. A system comprising:
a gateway, wherein the gateway comprises:
   a processor; and
   a memory coupled to the processor, wherein the memory comprises processor-executable instructions, which on execution, cause the processor to:
      receive a plurality of packets for transmission over a first communication network, wherein the plurality of packets are received via a primary network path;
      receive network status information, a plurality of parameters, latency parameters, network congestion information, forward network queue and a backend network queue from at least one of a first network transport modem and a second network transport modem;
      dynamically evaluate each of the received plurality of packets, based on the plurality of parameters;
      classify each of the plurality of packets into a latency sensitive packet and a latency agnostic packet based on the dynamic evaluation;
      determine network capacity of the primary network path and a secondary network path to transmit the latency sensitive packet and the latency agnostic packet for a downstream transmission, wherein the network capacity of the primary network path and the secondary network path is determined by:
         estimating an available network capacity for the downstream transmission of at least one packet based on the received network status information, the plurality of parameters, latency parameters, network congestion information, the forward network queue, and the backend network queue;
      split the latency sensitive packet and the latency agnostic packet between the primary network path and the secondary network path, based on the determined network capacity, wherein for splitting the latency sensitive packet and the latency agnostic packet, the processor is to:
         select the primary network path for transmitting the latency sensitive packet over the downstream transmission, wherein the determined network capacity of the primary network path is greater than a threshold value; and
         select the secondary network path for transmitting the latency agnostic packet over the downstream transmission, wherein the determined network capacity of the secondary network path is greater than the threshold value;
      prioritize the latency sensitive packet and the latency agnostic packet between the primary network path and the secondary network path based on the estimated available network capacity for the downstream transmission of the at least one packet, wherein the latency sensitive packet and the latency agnostic packet is prioritized using a rate-limited priority queue;
      adjust the rate limited priority queue for a continuity of an ongoing communication session corresponding to the downstream transmission of the at least one packet based on the latency sensitive packet and the latency agnostic packet; and
      transmit the latency sensitive packet and the latency agnostic packet to a client device, based on the selection and the adjusted rate limited priority queue.

2. The system of claim 1, further comprising:
a network apparatus communicatively coupled to the gateway, wherein the network apparatus is to:
   download the latency sensitive packet transmitted over the primary network path, and the latency agnostic packet transmitted over the secondary network path;
   merge the latency sensitive packet and the latency agnostic packet at real-time in an ongoing session; and
   output the merged latency sensitive packet and the latency agnostic packet at the ongoing session.

3. The system of claim 2, wherein the network apparatus comprises an outdoor receiver satellite unit and an outdoor terrestrial antenna.

4. The system of claim 1, wherein the primary network path corresponds to a terrestrial network, and the secondary network path corresponds to a satellite network.

5. The system of claim 1, wherein the primary network path corresponds to a two-way communication link and the secondary network path corresponds to a one-way communication link.

6. The system of claim 1, wherein the plurality of parameters include at least one of port addresses, historical characteristics of a session, packet size, network capacity, packet error rate, and packet metadata.

7. The system of claim 1, wherein the network capacity is determined based on at least one of network status information, the plurality of parameters, latency parameters, network congestion information, forward network queue and a backend network queue based on load over ongoing communication sessions.

8. The system of claim 1, wherein to dynamically evaluate each of the received plurality of packets, based on a plurality of parameters, the processor is to:
map the plurality of parameters with corresponding parameters stored in a network table, wherein the network table indicates a latency type to be associated with the received plurality of packets and the latency type indicated in the table is determined based on measures of expected latency of the plurality of network transports; and
dynamically evaluate each of the received plurality of packets based on results of mapping.

9. The system of claim 1, the processor is to:
predict network traffic at an ongoing session based on one or more user activities performed at the ongoing session; and
pre-allot the network capacity associated with the corresponding network path for transmission of the packet based on the predicted network traffic.

10. A method comprising:
receiving, by a processor, a plurality of packets for transmission over a first communication network, wherein the plurality of packets are received via a primary network path;
receiving, by the processor, network status information, a plurality of parameters, latency parameters, network congestion information, forward network queue and a backend network queue from at least one of a first network transport modem and a second network transport modem;
dynamically evaluating, by the processor, each of the received plurality of packets based on the plurality of parameters;
classifying, by the processor, each of the plurality of packets into a latency sensitive packet and a latency agnostic packet based on the dynamic evaluation;
determining, by the processor, network capacity of the primary network path and a secondary network path to transmit the latency sensitive packet and the latency agnostic packet for a downstream transmission, wherein the network capacity of the primary network path and the secondary network path is determined by:
estimating, by the processor, an available network capacity for the downstream transmission of at least one packet based on the received network status information, the plurality of parameters, latency parameters, network congestion information, the forward network queue, and the backend network queue;
splitting, by the processor, the latency sensitive packet and the latency agnostic packet between the primary network path and the secondary network path based on the determined network capacity, wherein the latency sensitive packet and the latency agnostic packet are split by:
selecting, by the processor, the primary network path for transmitting the latency sensitive packet over the downstream transmission, wherein the determined network capacity of the primary network path is greater than a threshold value; and
selecting, by the processor, the secondary network path for transmitting the latency agnostic packet over the downstream transmission, wherein the determined network capacity of the secondary network path is greater than the threshold value;
prioritizing, by the processor, the latency sensitive packet and the latency agnostic packet between the primary network path and the secondary network path based on the estimated available network capacity for the downstream transmission of the at least one packet, wherein the latency sensitive packet and the latency agnostic packet is prioritized using a rate-limited priority queue;
adjusting, by the processor, the rate limited priority queue for a continuity of an ongoing communication session corresponding to the downstream transmission of the at least one packet based on the latency sensitive packet and the latency agnostic packet; and
transmitting, by the processor, the latency sensitive packet and the latency agnostic packet to a client device, based on the selection and the adjusted rate limited priority queue.

11. The method of claim 10, further comprising:
downloading, by a network apparatus, the latency sensitive packet transmitted over the primary network path and the latency agnostic packet transmitted over the secondary network path;
merging, by the network apparatus, the latency sensitive packet and the latency agnostic packet at real-time in an ongoing session; and
outputting, by the network apparatus, the merged latency sensitive packet and the latency agnostic packet at the ongoing session.

12. The method of claim 11, wherein the network apparatus comprises a receiver satellite unit and an outdoor terrestrial antenna.

13. The method of claim 10, wherein the primary network path corresponds to a terrestrial network and the secondary network path corresponds to a satellite network.

14. The method of claim 10, wherein the primary network path corresponds to a two-way communication link and the secondary network path corresponds to a one-way communication link.

15. The method of claim 10, wherein the plurality of parameters comprises at least one of port addresses, and historical characteristics of a session, packet size, network capacity, packet error rate, and packet metadata.

16. The method of claim 10, wherein dynamically evaluating each of the received plurality of packets, based on a plurality of parameters comprises:
mapping, by the processor, the plurality of parameters with a corresponding parameters stored in a network table, wherein the network table indicates a latency type to be associated with the received plurality of packets, the latency type indicated in the table is determined based on measures of expected latency of the plurality of network transports; and
dynamically evaluating, by the processor, each of the received plurality of packets based on results of mapping.

17. The method of claim 10, further comprising:
predicting, by the processor, network traffic at an ongoing session based on one or more user activities performing at the ongoing session; and
pre-allocating, by the processor, the network capacity associated with the corresponding network path for transmission of the packet based on the predicted network traffic.

18. A non-transitory computer-readable medium comprising machine-readable instructions that are executable by a processor to:
receive a plurality of packets for transmission over a first communication network, wherein the plurality of packets are received via a primary network path;

receive network status information, a plurality of parameters, latency parameters, network congestion information, forward network queue and a backend network queue from at least one of a first network transport modem and a second network transport modem;

dynamically evaluate each of the received plurality of packets based on the plurality of parameters;

classify each of the plurality of packets into a latency sensitive packet and a latency agnostic packet based on the dynamic evaluation;

determine network capacity of the primary network path and a secondary network path to transmit the latency sensitive packet and the latency agnostic packet for a downstream transmission wherein the network capacity of the primary network path and the secondary network path is determined by:

estimating an available network capacity for the downstream transmission of at least one packet based on the received network status information, the plurality of parameters, latency parameters, network congestion information, the forward network queue, and the backend network queue;

split the latency sensitive packet and the latency agnostic packet between the primary network path and the secondary network path based on the determined network capacity, wherein the latency sensitive packet and the latency agnostic packet are split by:

select the primary network path for transmitting the latency sensitive packet over the downstream transmission, wherein the determined network capacity of the primary network path is greater than a threshold value; and select the secondary network path for transmitting the latency agnostic packet over the downstream transmission, wherein the determined network capacity of the secondary network path is greater than the threshold value;

prioritize the latency sensitive packet and the latency agnostic packet between the primary network path and the secondary network path based on the estimated available network capacity for the downstream transmission of the at least one packet, wherein the latency sensitive packet and the latency agnostic packet is prioritized using a rate-limited priority queue;

adjust the rate limited priority queue for a continuity of an ongoing communication session corresponding to the downstream transmission of the at least one packet based on the latency sensitive packet and the latency agnostic packet; and transmit the latency sensitive packet and the latency agnostic packet to a client device, based on the selection and the adjusted rate limited priority queue.

* * * * *